(12) United States Patent
Hoshi

(10) Patent No.: US 6,374,033 B2
(45) Date of Patent: *Apr. 16, 2002

(54) SIGNAL PROCESSING APPARATUS AND METHOD

(75) Inventor: Hidenori Hoshi, Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/896,125

(22) Filed: Jul. 17, 1997

(30) Foreign Application Priority Data

Jul. 19, 1996 (JP) .............................. 8-190793
Jul. 16, 1997 (JP) .............................. 9-191143

(51) Int. Cl.$^7$ ................................ H04N 5/91
(52) U.S. Cl. .......................... 386/32; 386/31
(58) Field of Search .............................. 348/714, 715, 348/716, 717, 718, 416; 386/109, 111, 112, 124, 27, 33, 34, 40, 31, 32, 44; H04N 5/91

(56) References Cited

U.S. PATENT DOCUMENTS 5,450,130 A    9/1995  Foley ........................ 348/391
5,675,387 A * 10/1997  Hoogenboom et al. ..... 348/416

FOREIGN PATENT DOCUMENTS

DE    44412955    5/1996
EP    0710029     5/1996

OTHER PUBLICATIONS

Institute of Electrical and Electronics Engineers; Winzker M. et al; "Architecture and Memory Requirements for Stand–alone and Hierarchical MPEG2 HDTV–Decoders with Synchronous Drams"; International Symposium on Circuits and Systems (ISCAS); vol. 1, pp. 609–612.

Institute of Electrical and Electronics Engineers; Matsumura T. et al.; "A Chip Set Architecture for Programmable Real–Time MPEG2 Video Encoder", Proceedings of the Custom Integrated Circuits Conference,; NR. Conf. 17, pp. 393–396.

Institute of Electrical and Electronics Engineers; Fujiwara a. et al.; "A 200 MHz 16 Mbit Synchronous DRAM with Block Access Mode" 1994 Symposium on VLSI Circuits. Digest of Technical Paper, Proceedings of 1994 IEEE Symposium on VLSI Circuits, 1994, pp. 79–80.

Kizaki Y. et al.; 4–/16–Mbit Synchronous Dram for High–Speed Image Processing:; Hitachi Review; vol. 43, No. 5, Oct. 1, 1994, pp. 217–220.

Jones F.; "A New Era of Fast Dynamic Rams"; IEEE Spectrum, vol. 29, No. 10, Oct. 1, 1992, pp. 43–45, 48–49.

Schmidt R.L.; "a Memory Control Chip for Formatting Data into Blocks Suitable for Video Coding Applications"; IEEE Transactions on Circuits and Systems; vol. 36, No. 10, Oct. 1, 1989, pp. 1275–1280.

* cited by examiner

Primary Examiner—Robert Chevalier
(74) Attorney, Agent, or Firm—Fitzpatrick, Cella, Harper & Scinto

(57) ABSTRACT

There is provided a signal processing apparatus for performing signal processing of image data in units of blocks each consisting of n (vertical)×m (horizontal) pixels, including a memory for storing the image data, a division unit for dividing image data in one horizontal period of the image data into burst lengths, each of which equals at least a multiple of m and in which the multiple of m×n is equal to or less than the capacity of the memory, and an allocation unit for allocating data sequences of the burst length at an identical row address so that all image data in the block are aligned at the identical row address.

20 Claims, 26 Drawing Sheets

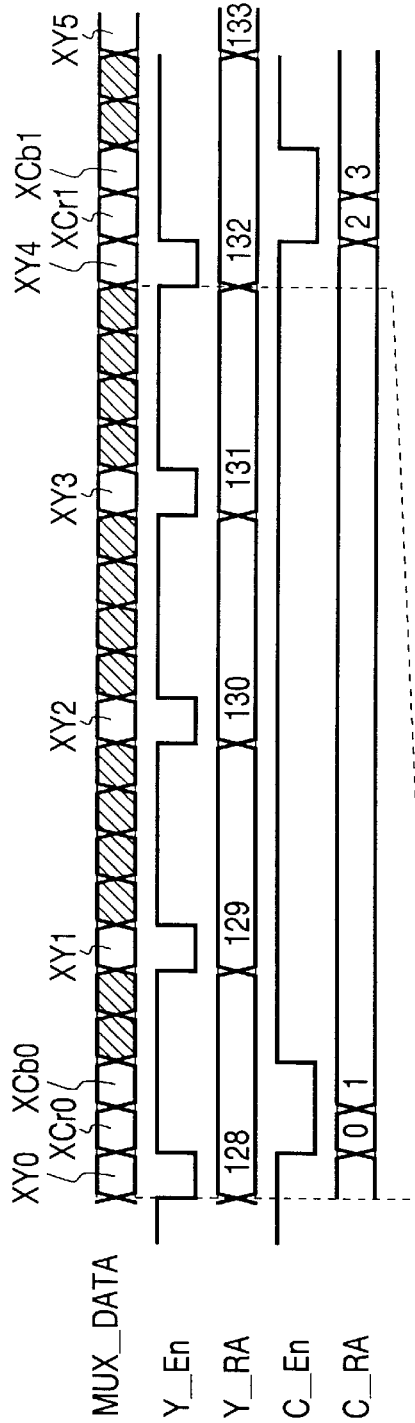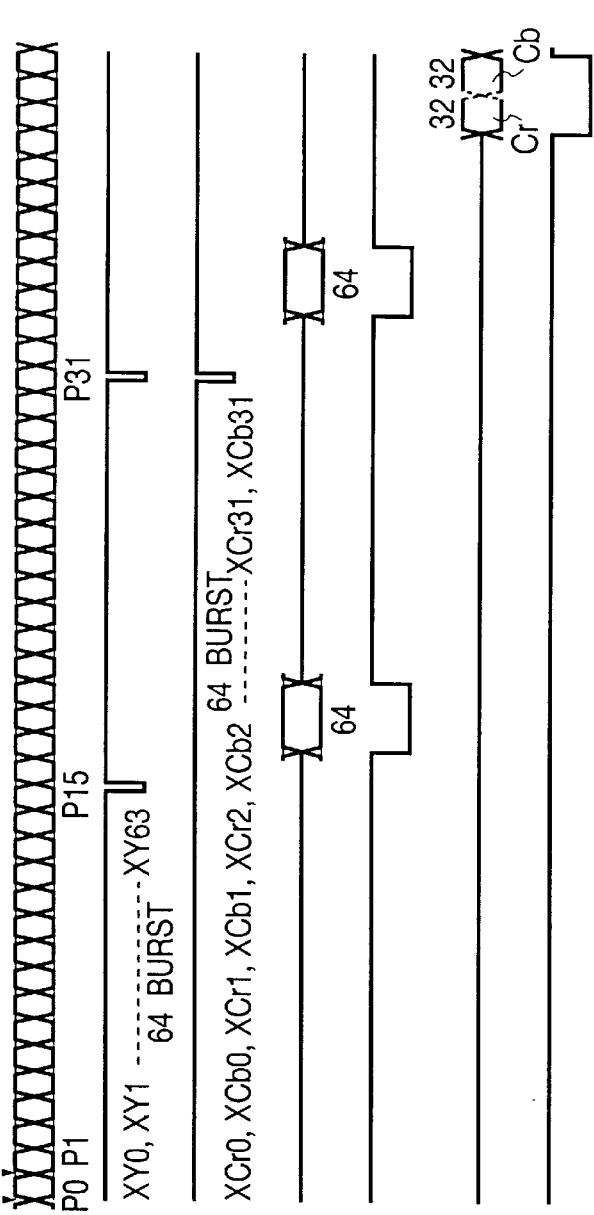

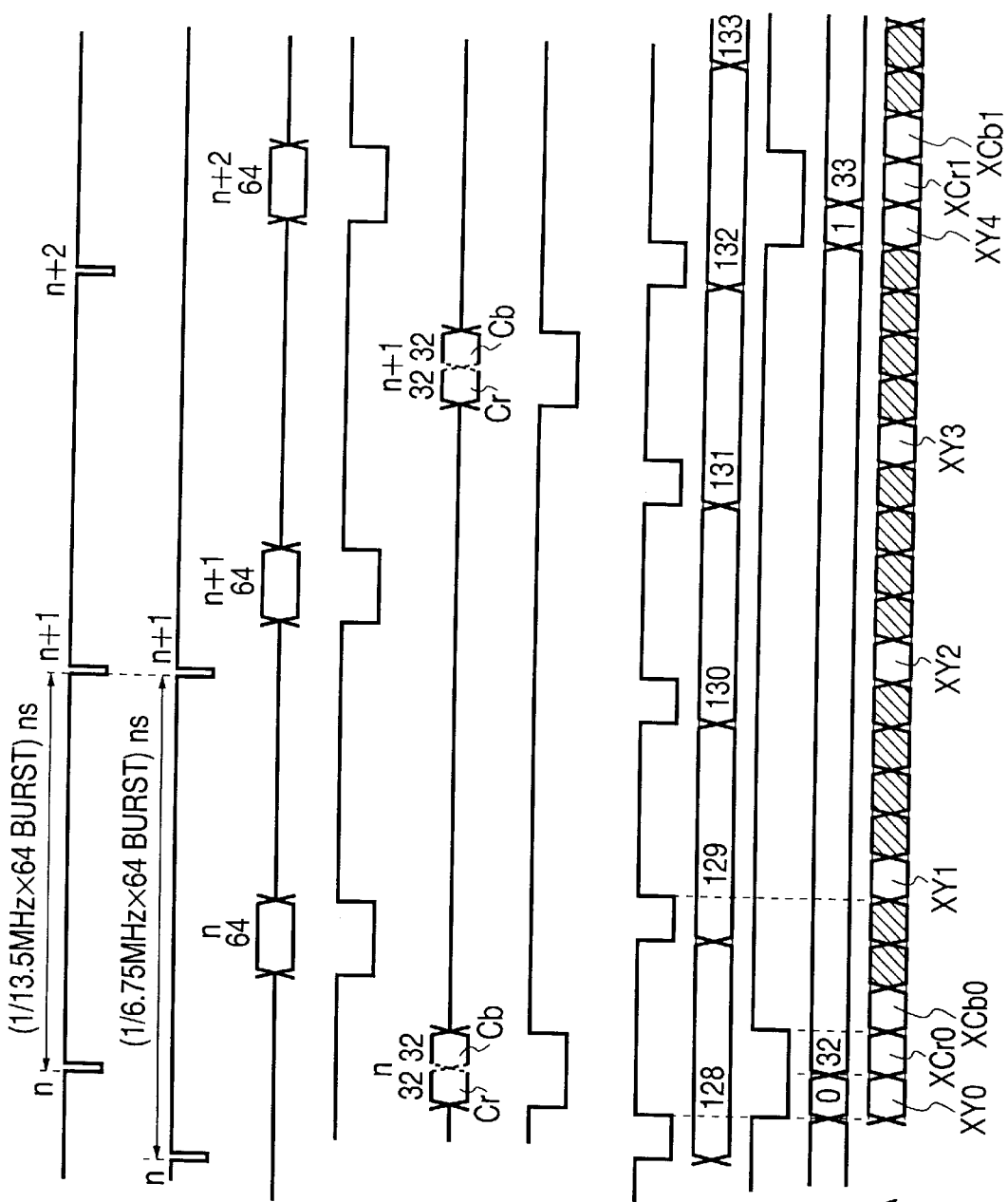

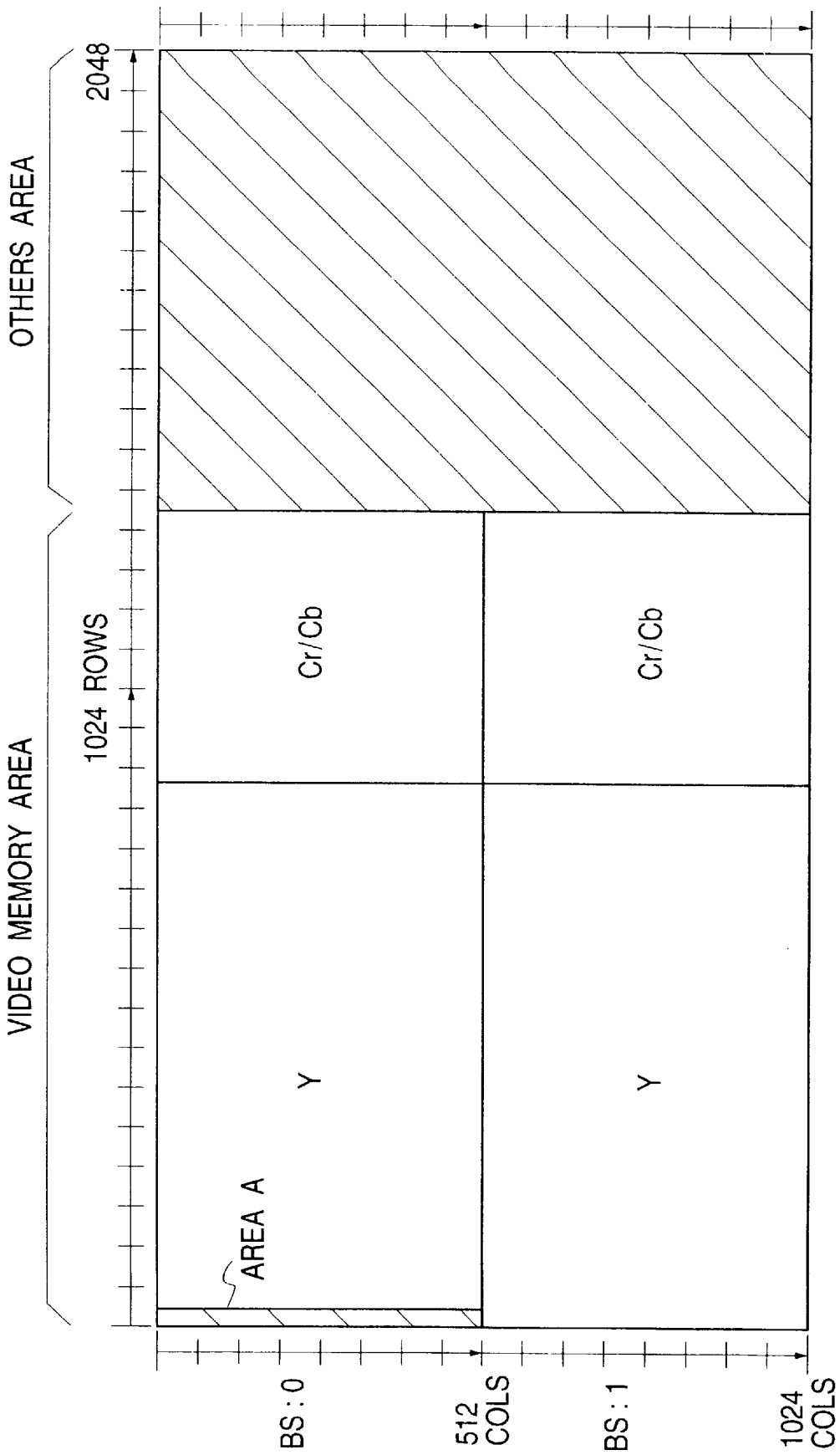

SIGNAL PROCESSING APPARATUS AND METHOD

BACKGROUND OF THE INVENTION

1. Field of the Invention

The present invention relates to a signal processing apparatus for performing processing such as coding, decoding of the like of various kinds of data, e.g., image data and the like.

2. Related Background Art

Conventionally, various apparatuses that encode various kinds of data in huge data volumes to reduce their data volume and allow transmission at relatively low transmission rates have been developed.

For example, in a digital VTR which records image data on a recording medium such as a magnetic tape or the like, standards for recording input image data of about 124 Mbps on a magnetic tape by compressing it to nearly ⅕ (about 25 Mbps), and reproducing the compressed data have been defined.

In the digital VTR complying with such standards, input data is DCT (Discrete Cosine Transform)-transformed and the transformed data is quantized. Then, the quantized data is variable-length-coded to attain data compression. Furthermore, the quantization step upon quantizing data is varied based on various parameters, and rate control is done to obtain constant data volumes after variable-length coding.

Also, MPEG standards that compress input image data using inter-frame or inter-field motion compensated predictive coding, and further compress the predictive coded data using the above-mentioned DCT, quantization, and variable-length coding have been proposed. Various apparatuses such as CD-ROMs and the like that correspond to such standards have been developed.

In the above-mentioned apparatuses such as the digital VTR, CD-ROM, and the like, various kinds of signal processing must be done in real time. In order to realize such real-time processing, a plurality of memories corresponding to various kinds of signal processing are used, resulting in an increase in cost of the entire device.

SUMMARY OF THE INVENTION

Under the circumstances described above, it is one object of the present invention is to provide a signal processing apparatus and method, that can attain a cost reduction and down-sizing of the entire device by reducing memories.

In order to achieve the above object, according to one preferred embodiment of the present invention, there is provided a signal processing apparatus for performing signal processing of image data in units of blocks each consisting of n (vertical)×m (horizontal) pixels, comprising: a memory for storing the image data; division means for dividing image data in one horizontal period of the image data into burst lengths, each of which equals at least a multiple of m and in which the multiple of m×n is not more than a capacity of the memory; and allocation means for allocating data sequences of the burst length at an identical row address so that all image data in the block are aligned at the identical row address.

According to another preferred embodiment of the present invention, there is provided a signal processing apparatus comprising: memory means for storing data to be processed and other data; signal processing means for performing predetermined signal processing for the data while accessing the memory means; and control means for controlling read/write of the data with respect to the memory means, wherein the control means allocates the data in the memory means in accordance with a processing order and a processing unit by the signal processing means, and stores the other data which is not to be processed in an empty area in the memory means.

According to still another preferred embodiment of the present invention, there is provided a storage method for storing image data in a memory to perform signal processing of the image data in units of blocks each consisting of n (vertical)×m (horizontal) pixels, comprising the steps of: dividing image data in one horizontal period of the image data into blocks each having a burst length, which equals at least a multiple of m and in which the multiple of m×n is not more than a capacity of the memory; and allocating data sequences of the burst length at an identical row address so that all image data in the block are aligned at the identical row address.

According to still another preferred embodiment of the present invention, there is provided a signal processing method comprising the steps of: storing data to be processed and other data in a memory; performing predetermined signal processing for the data while accessing the memory; and controlling read/write of the data with respect to the memory, wherein the control step includes the step of allocating the data in the memory in accordance with a processing order and a processing unit in the signal processing step, and storing the other data which is not to be processed in an empty area in the memory.

Other objects, features and advantages of the invention will become apparent from the following detailed description taken in conjunction with the accompanying drawings.

BRIEF DESCRIPTION OF THE DRAWINGS

FIGS. 20A, 20B, 20C, 20D, 20E, 20F, 20G, 20H, 20I, 20J, 20K and 20A' are timing charts for explaining the timings of signals to be read/written from/in the buffer 205 upon coding;

FIGS. 21A, 21B, 21C, 21D, 21E, 21F, 21G, 21H, 21I, 21J and 21K are timing charts for explaining the timings of signals to be read/written from/in the buffer 205 upon decoding;

FIG. 22 is a view for explaining mapping of the memory space in a main memory 206;

DETAILED DESCRIPTION OF THE PREFERRED EMBODIMENTS

The first embodiment of the present invention will be described below with reference to FIGS. 1 to 10B.

Figure 1:
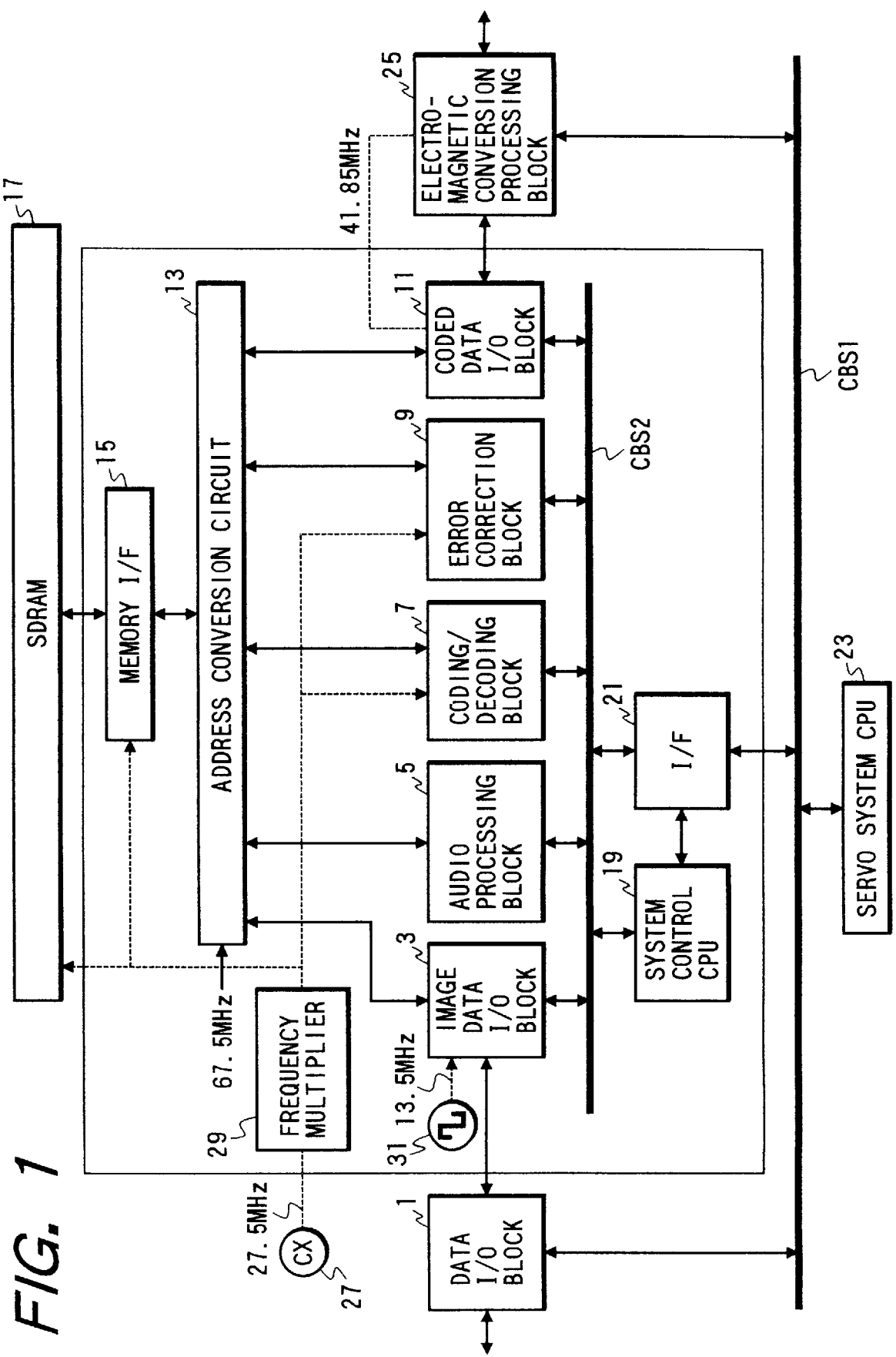
FIG. 1 is a block diagram showing the arrangement of a signal processing apparatus according to the first embodiment of the present invention.

FIG. 1 is a block diagram of a signal processing apparatus according to the first embodiment of the present invention, which is applied to a digital VTR.

In this embodiment, as shown in FIG. 1, various processing blocks access a memory at desired timings under the control of internal and external CPUs, and these access requests are arbitrated by a memory controller to guarantee the operations of the processing blocks.

The individual processing blocks in this embodiment can execute real-time processing of SD compatible image and audio data. In this embodiment, such processing units are parallelly arranged and image and audio data are time-divisionally supplied to the respective processing circuits, so that HD compatible image and audio data with a data volume per frame twice that of the SD image data can be processed in real time.

As shown in FIG. 1, the processing circuit in each processing unit mainly includes a data I/0block 1 for processing data such as input data from a camera, output data to an EVF, line I/O data, and the like, an image data I/O block 3 for performing processing such as Y/C separation or the like of the input data, an audio processing block 5, a coding/decoding block 7 for performing variable-length coding/decoding of image data using DCT, an error correction block 9, a coded data I/O block 11 for converting the coded data into the tape format upon recording, and executing deformatting upon reproduction, and an electromagnetic processing block 25 for performing electromagnetic conversion upon recording/reproduction. These blocks exchange data with an external memory 17 via an address conversion circuit 13 and a memory interface 15.

The operations of these processing circuits are controlled by predetermined commands supplied from a system control CPU 19 that controls the processing of the internal electrical system via a CPU bus CBS2, and predetermined commands supplied from an external servo system CPU 23 via a CPU bus CBS1, an interface 21, and the bus CBS2, so as to attain time-divisional processing of the parallelly arranged blocks.

Figure 2A:
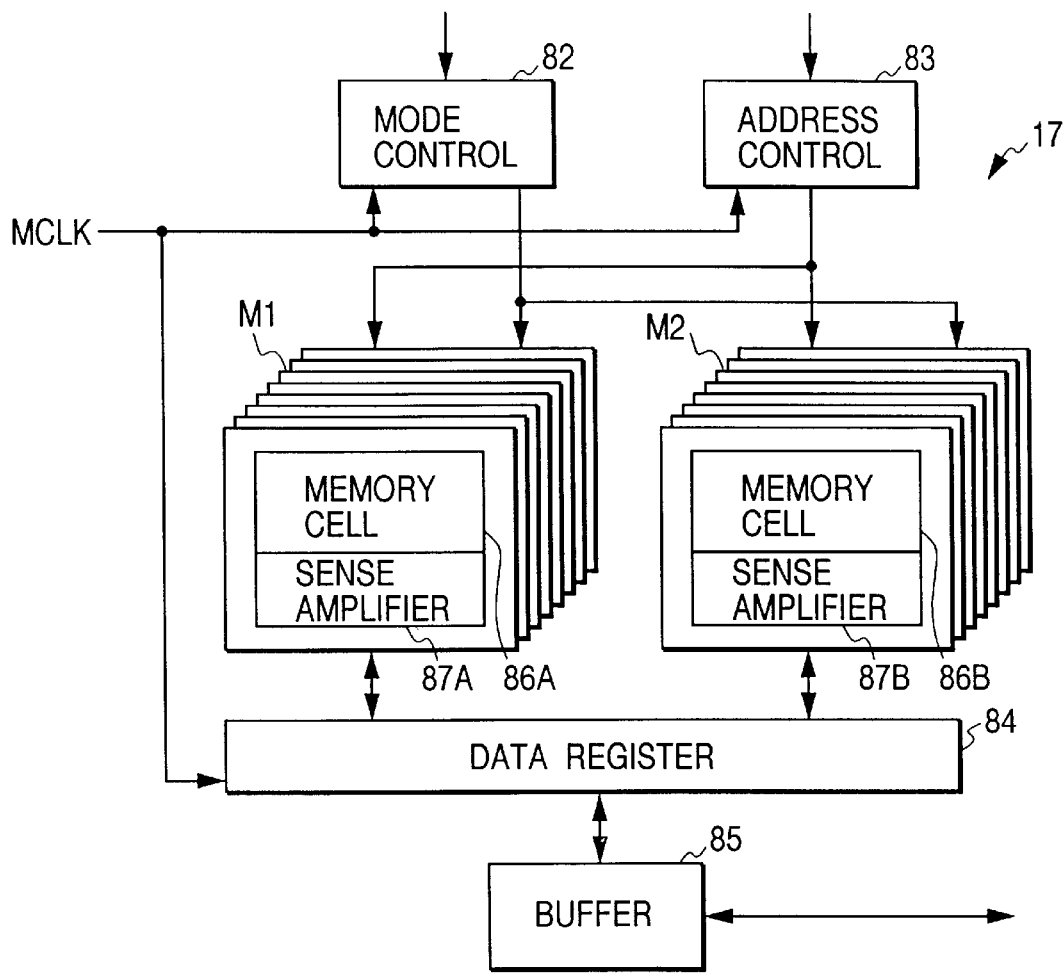
FIGS. 2A and 2B are respectively a block diagram and a map showing the arrangement of an SDRAM in the first embodiment.

The memory 17 in this embodiment uses an SDRAM (Synchronous-DRAM) which can perform burst transfer of data in synchronism with the leading edge of a clock. The SDRAM 17 comprises two memory arrays M1 and M2, as shown in FIG. 2A. An external, jitter-free frequency oscillator 27 (FIG. 1) supplies a clock signal of, e.g., 27.5 MHz to a frequency multiplier 29 in the unit, and the multiplier 29 generates a reference clock signal of 67.5 MHz by multiplying the input signal with a given constant and supplies it to the SDRAM 17. The reference clock (MCLK) of 67.5 MHz is set at an integer multiple (5 times) of 13.5 MHz locked with an H_Sync signal generated by a frequency oscillator 31. Furthermore, the SDRAM 17 comprises a mode controller 82 for setting the read/write mode of the memory arrays on the basis of control signals and address signals from the address conversion circuit 13 and the memory I/F 15 in FIG. 1, an address controller 83 for designating addresses in the memory arrays on the basis of the supplied address data, a shift register 84 for performing serial-to-parallel conversion, and an I/O buffer memory 85.

The memory arrays M1 and M2 in such memory 17 respectively comprise memory cells (DRAMs) 86A and 86B, and sense amplifiers 87A and 87B arranged independently of these memory cells. By burst-transferring a predetermined volume of data held by these sense amplifiers in synchronism with clocks, the transfer rate outside the memory and the operation speed in the internal banks can be independently set, and high-speed read/write accesses can be accomplished as a whole.

Figure 2B:
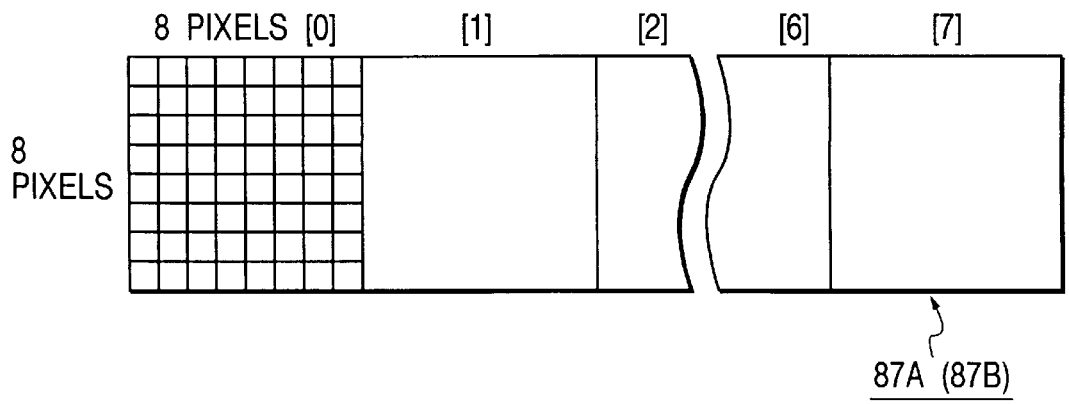

Furthermore, each of the sense amplifiers 87A and 87B in this embodiment has a capacity for eight (8×8) pixels, as shown in FIG. 2B, and can perform burst transfer in units of eight pixels.

The memory space of each of the memory cells 86A and 86B in the memory 17 is defined by a video memory (VM) area with a capacity for one frame, and a track memory (TM) area with a capacity for storing coded data for one frame. The memory cell in each area can be set in either the write or read mode in units of frames, and the individual processing blocks exchange data with the VM or TM areas via the sense amplifiers 87A and 87B in correspondence with their processing modes.

Figure 3:
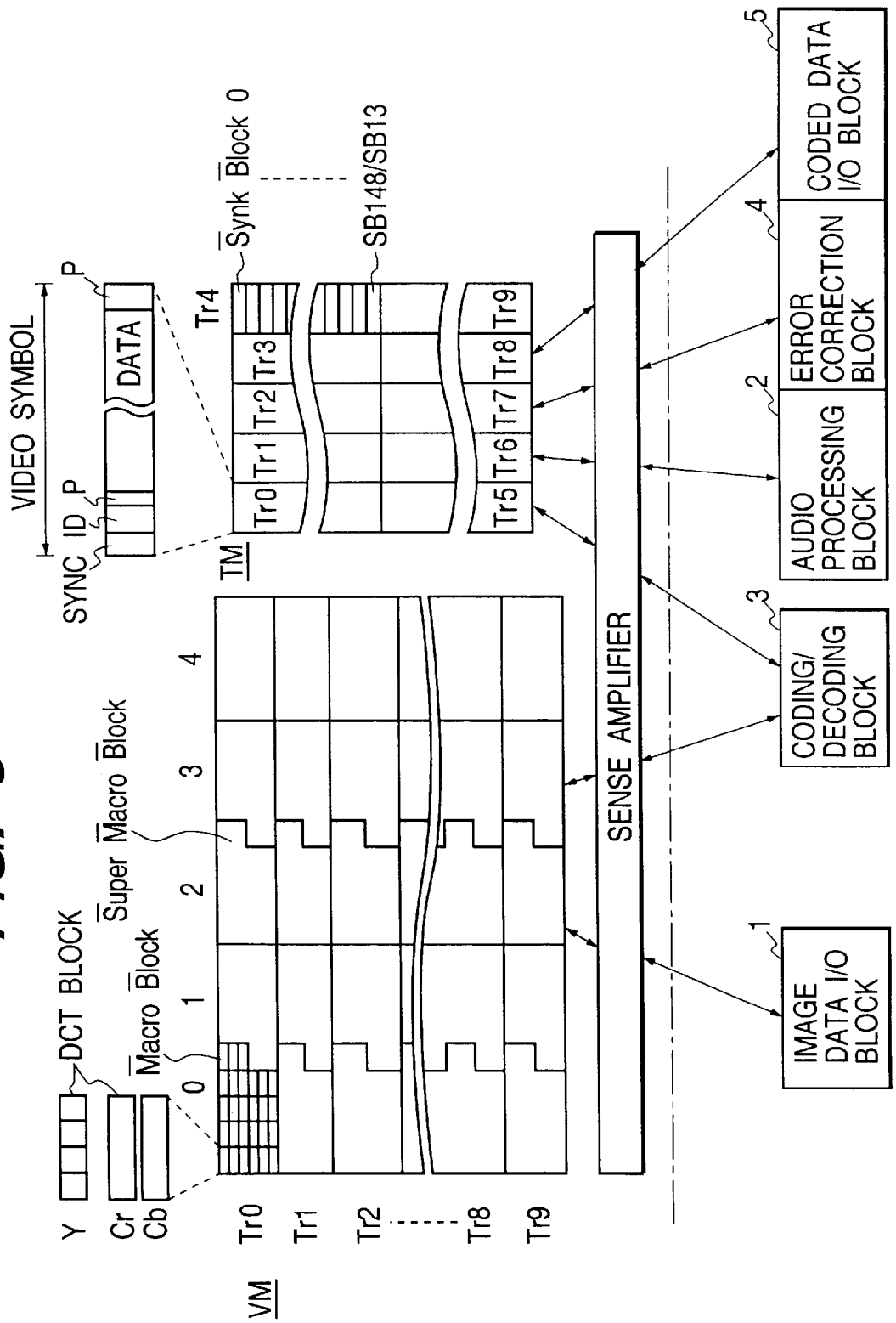
FIG. 3 is a view showing the access relationship among the individual processing blocks with respect to the SDRAM in the first embodiment.

More specifically, as shown in FIG. 3, the image data I/O block 3 exclusively exchanges data with the VM area. The coding/decoding block 7 exchanges data with both the VM and TM areas. That is, upon coding, the coding/decoding block 7 reads out data from the VM area, and writes coded data in the TM area. Upon decoding, the coding/decoding block 7 reads out data from the TM area, and writes decoded data in the VM area.

Similarly, the audio processing block 5, error correction block 9, and coded data I/O block 11 exclusively exchange data with the TM area.

The address spaces in the individual regions have formats, as shown in FIG. 3.

More specifically, image data (Y, Cr, Cb) before coding is written in the VM area in units of pixels, and this image data (720 horizontal pixels×480 vertical pixels per frame in the NTSC scheme) is distributed to 50 (5 horizontal blocks×10 vertical blocks) super macro blocks (to be referred to as SMBs hereinafter), each of which is made up of 27 macro blocks (to be referred to as MBs hereinafter) each consisting of four DCT blocks of luminance data and one DCT block each for color difference data.

Note that each DCT block is made up of 8×8 pixels.

On the other hand, image data for one frame, which has the above-mentioned number of pixels, is recorded over 10 tracks on the magnetic tape in the NTSC scheme (12 tracks in the PAL scheme) after it is coded. In image data before coding, data for five SMBs aligned in the horizontal direction correspond to one track.

Hence, as addresses for accessing the VM area, h and v respectively corresponding to the horizontal and vertical directions of each pixel, track number Tr, an SMB number in each track, an MB number in each SMB, and a DCT number in each MB are preferably used.

On the other hand, on the TM area, coded image data and error correction codes and the like are distributed and recorded over the above-mentioned 10 tracks (12 tracks in the PAL scheme), and 149 sync blocks (to be to be referred to as SBs hereinafter) are recorded on an area corresponding to each track.

Likewise, audio data and error correction codes and the like (not shown) are also distributed and recorded on 10 tracks (12 tracks in the PAL scheme) independently of the image data area, and 14 SBs are recorded on an area corresponding to each track.

Each SB of image data/audio data is made up of synchronization data (to be referred to as SY hereinafter) indicating the head of the SB, ID data (to be referred to as ID hereinafter) indicating the addresses, attribute, and the like of a signal, effective data (image/audio), and parity data.

Hence, as addresses upon accessing this TM area, track number Tr, an SB number in each Tr, and a symbol number (to be referred to as an SMB hereinafter) in each SB are preferably used.

Accesses of the individual processing blocks to the above-mentioned memory 17 are subjected to arbitration control and address control by the address conversion circuit 13.

Although not shown, the address conversion circuit 13 receives commands for designating the types and the like of various operation modes such as a reproduction mode, recording mode, and the like from the internal and external CPUs 19 and 23 via the bus CBS2 or directly receives the modes by predetermined bits of the addresses of the individual blocks, and schedules the priority order of data transfer in correspondence with such information. Also, the circuit 13 arbitrates data transfer between the individual processing blocks and the memory 17 in accordance with access requests (to be referred to as Req hereinafter) from the blocks.

The commands are determined when the internal and external CPUs detect the operation modes set by the respective switches of a device main body (not shown), and correspond to, e.g., various operation modes such as a coding mode and decoding mode, or a special reproduction mode and the like in a VTR.

Note that the operation modes designated by the commands are not limited to those specific modes described above, and include various operations such as edit operations, e.g., image synthesis, after recording, insertion, and the like, dubbing, and the like.

The address conversion circuit 13 generates predetermined addresses (to be described later) in units of processing blocks so as to attain addressing in optimal data units corresponding to the processing modes of the individual blocks and the address space of the memory 17.

The address generation operation in the address conversion circuit 13 is variably set on the basis of parameters corresponding to the image types supplied from the internal and external CPUs. For example, the circuit 13 generates different addresses in correspondence with whether the image data to be processed is SD or HD data or the image type (size) such as NTSC, PAL, or the like.

The individual blocks of each processing circuit respectively receive required clocks, and operate in synchronism with these clocks.

These clocks are generated on the basis of synchronization signals H_Sync and V_Sync, an internal reference clock, and the like extracted from an input signal, and include a first clock (13.5 MHz in this embodiment) which is supplied to the image data I/O block 3 and is synchronized with an input signal, a second clock (not shown; 48 kHz in this embodiment) which is supplied to the audio processing block 5 to process audio data, a third clock (67.5 MHz in this embodiment) supplied to the coding/decoding block 7, the error correction block 9, the address conversion circuit 13, the memory I/F 15, and the memory 17, and a fourth clock (41.85 MHz in this embodiment) which is supplied from the electromagnetic processing block to the coded data I/O block 11 in synchronism with the rotation of a drum and is used for recording/reproducing onto a recording medium. The individual processing blocks execute processing operations corresponding to the supplied clocks.

In the above-mentioned processing circuit, a memory arrangement considering scene-by-scene recording will be described in detail below.

Figure 4:
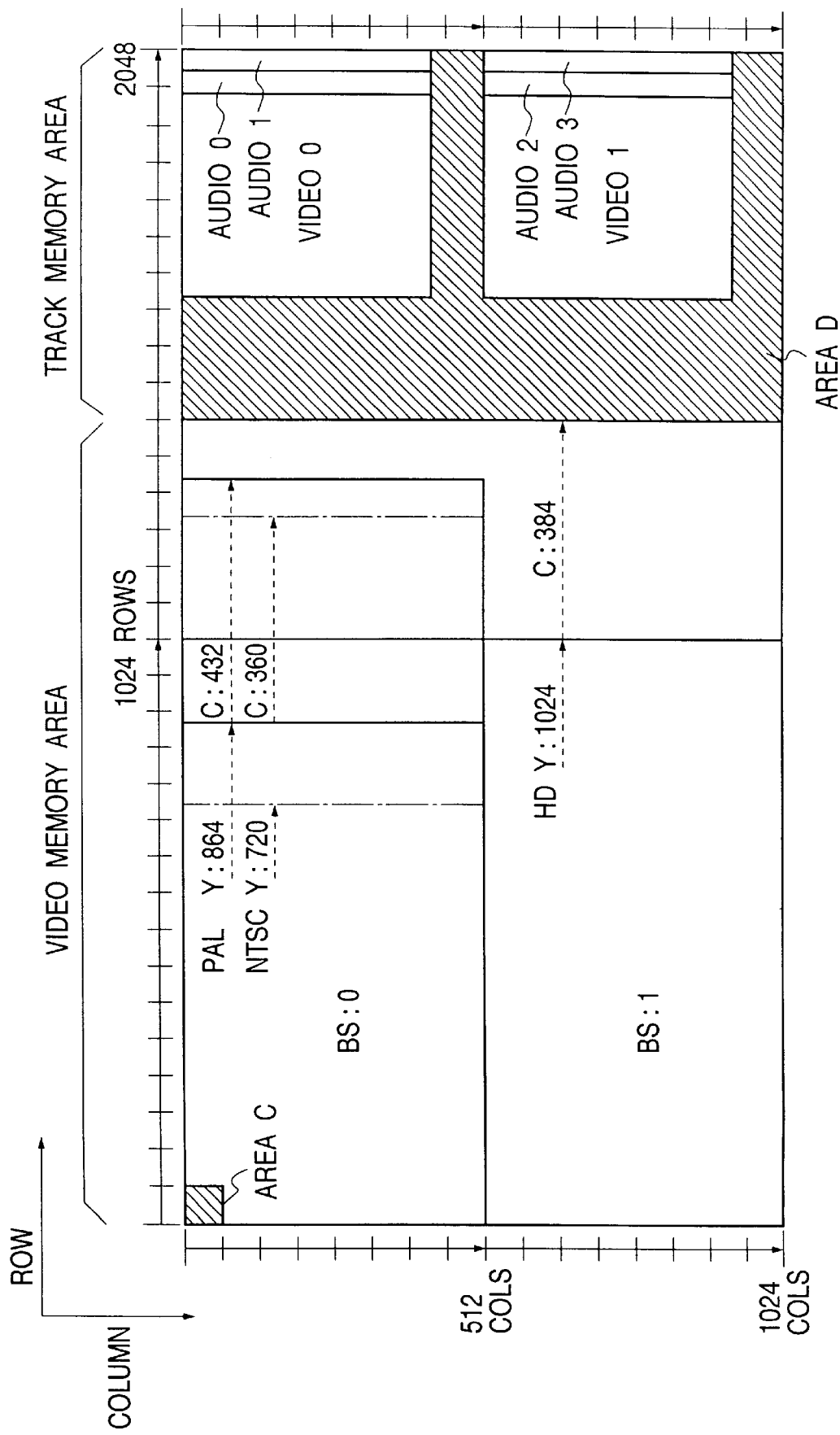
FIG. 4 is a view for explaining data mapping for the SDRAM in the first embodiment.

FIG. 4 shows the full area of the memory (2 Mbyte×8 bit SDRAM). Absolute addresses 0 to 2047 can be assigned in the row direction, and absolute addresses 0 to 1023 can be assigned in the column direction. As described above, in consideration of information volumes in SD (NTSC/PAL)/HD data, the VM and TM areas are divided, as shown in FIG. 4.

The memory mapping rules for the VM area will be described below.

As for NTSC and PAL data, the VM area is divided by 512 columns into two areas, which are respectively defined by bank 0 (to be referred to as BS0 hereinafter) and bank 1 (to be referred to as BS1 hereinafter). Basically, the areas of BS0 and BS1 are similarly divided, and BS0 will be explained below.

The luminance signals (to be referred to as Y signals hereinafter) of NTSC data are assigned to an area for 720 rows, and the Y signals of PAL data are assigned to an area for 864 rows.

On the other hand, the color difference signals (to be referred to as C signals hereinafter) of NTSC data are assigned to an area for 360 rows adjacent to the Y signals of PAL data, and similarly, the C signals of PAL data are assigned to an area for 432 rows.

As for HD data, two banks BS0 and BS1 make up a single bank. The Y signals are assigned to an area for 1024 rows, and the C signals are assigned to an area for 384 rows adjacent to the Y signals.

Figure 5:
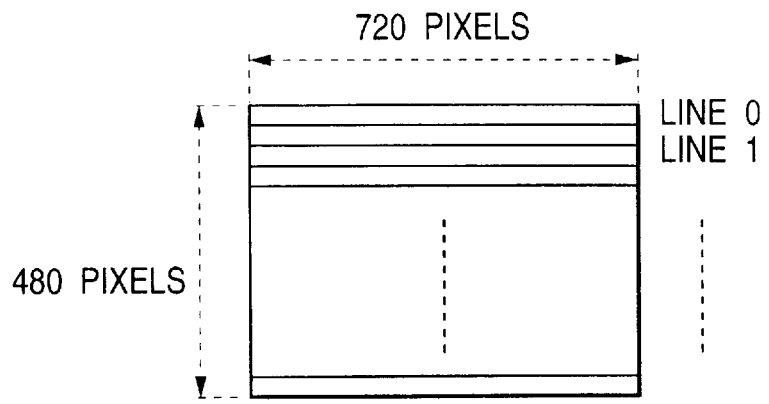
FIG. 5 is a view showing the format of Y signals for one frame in the NTSC scheme.

FIG. 5 shows Y signals for one frame in the NTSC scheme, which frame is made up of 480 lines (Line 0 to Line 479) each including 720 pixels.

Figure 6:
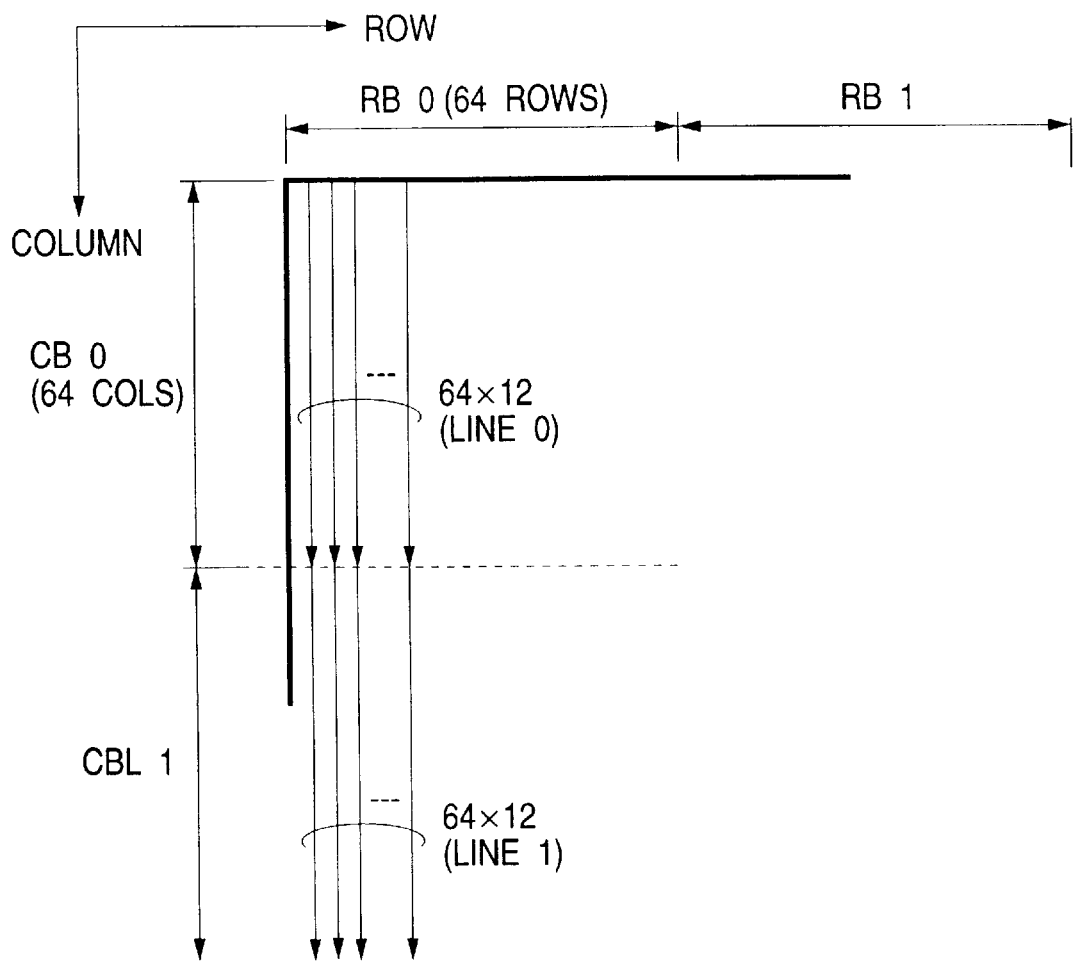
FIG. 6 is a view for explaining accesses to a VM area in the SDRAM in the first embodiment.

FIG. 6 is an enlarged view of an area C in FIG. 4. In FIG. 6, 64 rows make up each row block (to be referred to as RB hereinafter), and similarly, 64 columns make up each column block (to be referred to as CB hereinafter).

Note that image data for one line in FIG. 5 is divided into 12 blocks in units of 64 pixels, and the 12 divided blocks of Line 0 are sequentially stored in the row direction, as shown in an area (RB0, CB0) in FIG. 6. Analogously, data in Line 1 are sequentially stored in an area (RB0, CB1). The same applies to image data of the remaining lines.

The memory mapping rules of the TM area will be explained below.

The TM area stores compressed/coded image data in two bank areas Video0 and Video1, as shown in FIG. 4, and stores audio data in four bank areas Audio0, Audio1, Audio2, and Audio3. Each of these banks is divided into a maximum of 12 tracks, in each of which data is stored in units of sync blocks, as shown in FIG. 3. In this embodiment, data is stored in units of 88 bytes except for a 2-byte Sync signal.

Figure 7:
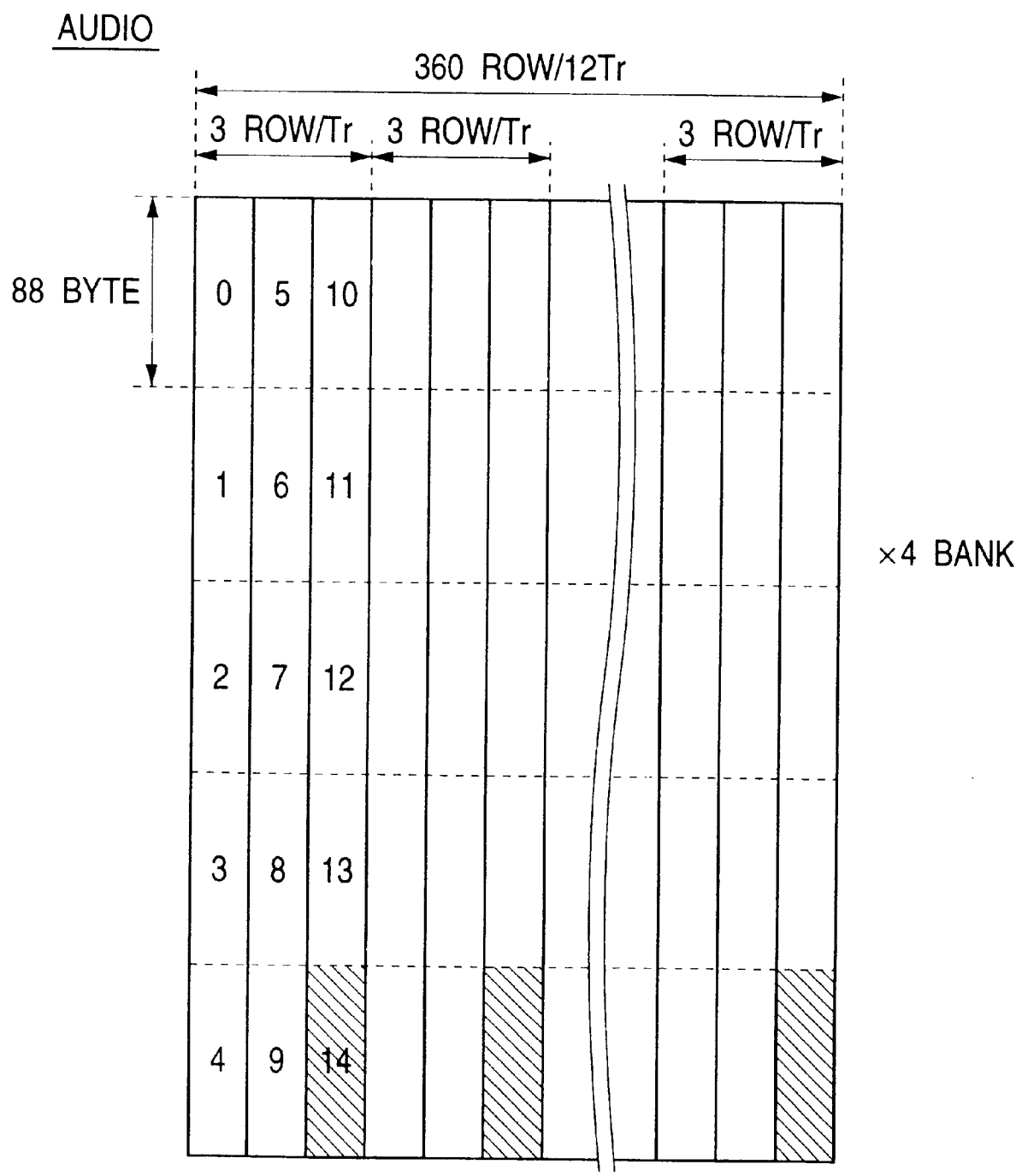
FIG. 7 is a view showing the storage area of audio data in a TM area in the SDRAM of the present invention.

FIG. 7 shows one bank of the audio data area in the TM area in detail. Five SBs are successively addressed and stored at one row address in the column direction. Hence, 14 SBs of audio data in one track are stored across three row addresses. Assuming that audio data for one frame consists of 12 tracks, one bank area is assigned to a 36 row×88 byte×5 SB area. In this embodiment, such areas for four banks are prepared.

Figure 8:
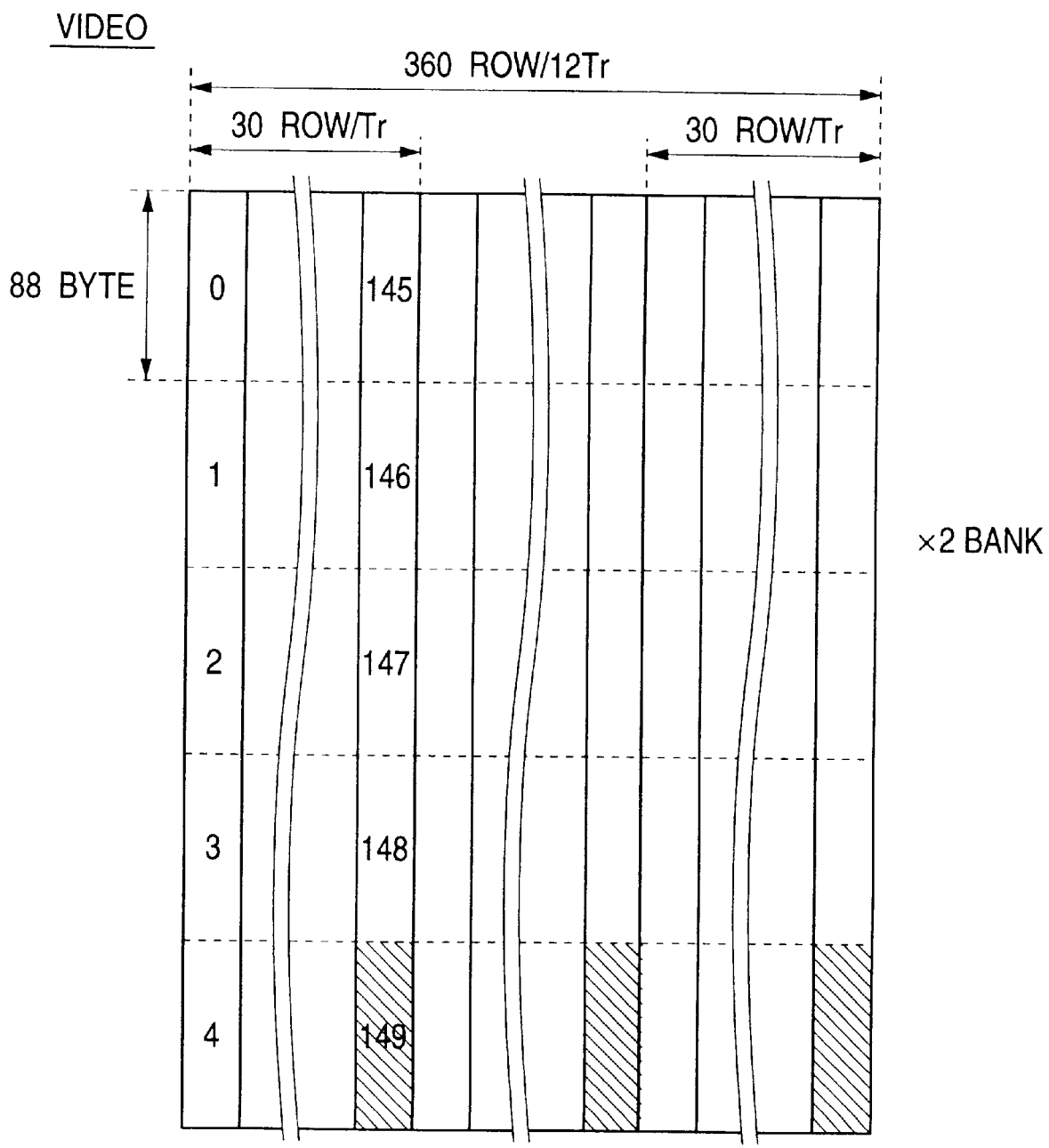
FIG. 8 is a view showing the storage area of video data in the TM area in the SDRAM of the present invention.

In the same fashion, FIG. 8 shows one bank of the video data area in the TM area in detail. Five SBs are successively addressed and stored at one row address in the column direction. Hence, 149 SBs of video data in one track are stored across 30 row addresses. Assuming that video data for one frame consists of 12 tracks, one bank area is assigned to a 360 row×88 byte×5 SB area. In this embodiment, such areas for two banks are prepared.

In this embodiment, each track area of the audio/video banks has an empty area for one SB (the 14th SB in the audio area, the 149th SB in the video area). In this area, for example, the error correction block shown in FIG. 1 writes error information in units of SBs, and the coding/decoding block 7 looks up the stored information upon decoding to check if data is decodable.

In this embodiment, an 88 byte (except for 2-byte sync signal per SB)×5 area is assured in the column direction, but the multiplier may be an integer multiple other than 5.

A hatched area D shown in FIG. 4 is an extra area of the above-mentioned processing, and is used for storing data other than the input image data and audio data in this embodiment.

For example, in the camera built-in type VTR, on-screen display (OSD) data for controlling character displays (counter, time, date, and the like) in the EVF or monitor and imprinting of characters (time, date, and the like) onto a video tape under the control of, e.g., a microcomputer may be stored in this area.

Figure 9A:
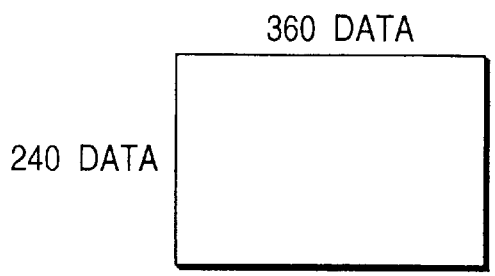
FIGS. 9A, 9B and 9C are views for explaining the on-screen display data sizes.
Figure 9B:
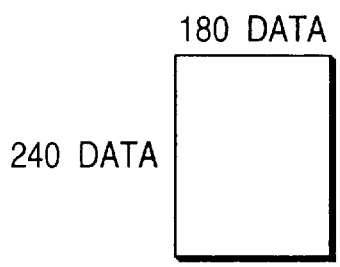
Figure 9C:
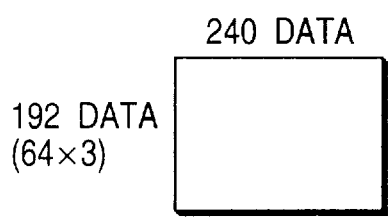

FIG. 9A shows the data size of SD on-screen display data. In this embodiment, the on-screen data size is ½ in both the horizontal and vertical directions with respect to that (720 pixel×480 pixel) of video data. Hence, the on-screen display data is 360 data×240 data, and one OSD data is expressed by 4 bits. For this reason, since two data can be expressed by 1 byte, a 180×240 data area need only be assured on the actual memory, as shown in FIG. 9B. In the actual OSD access mode, since the image data I/O block 3 shown in FIG. 1 mainly makes high-speed accesses in units of 64 bytes, 180 data in the row direction are divided into three blocks in units of 64 data (the last one block includes dummy data), and 64 data are repetitively assigned in the column direction, thus assuring a 240 data×192 data (64 data×3) OSD area, as shown in FIG. 9C.

Figure 10A:
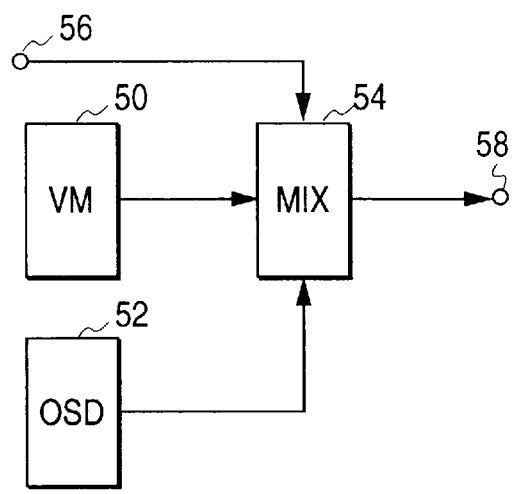
FIGS. 10A and 10B are block diagrams showing the arrangement for realizing a means for multiplexing video data and OSD data and outputting the multiplexed data.

FIG. 10A is a simple block diagram used when OSD data is multiplexed and output. Image data read out from a VM area 50 shown in FIG. 4, and OSD data read out from an OSD area 52 shown in FIG. 9C are supplied to a multiplexer 54. The multiplexer 54 selects image data alone or image data multiplexed with the OSD data in accordance with a control signal 56 supplied from, e.g., the system control CPU 19, and outputs the selected data to an output terminal 58.

Figure 10B:
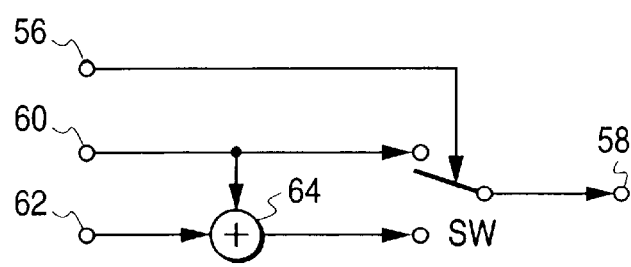

FIG. 10B shows the internal circuit of the multiplexer 54, and the same reference numerals in FIG. 10B denote the same parts as in FIG. 10A. Image data output from the VM area and input via an input terminal 60 is supplied to an SW, and is also supplied to an adder 64. The image data is added to data output from the OSD area and input form an input terminal 62, and the sum data is supplied to the SW. The SW selects one of the input data in accordance with the control signal from the CPU, and outputs the selected data.

Note that memory accesses in the above-mentioned processing are realized by access request arbitration and address conversion by the address conversion circuit 13 (FIG. 1), and access processing to the main memory by the memory I/F 15.

Arbitration of memory access requests from the individual blocks, and access address and mode output means in the above-mentioned address conversion circuit will be explained below with the aid of FIG. 11 and FIGS. 12A to 12L. Assume that two processing blocks A and B individually make accesses for the sake of simplicity.

Figure 11:
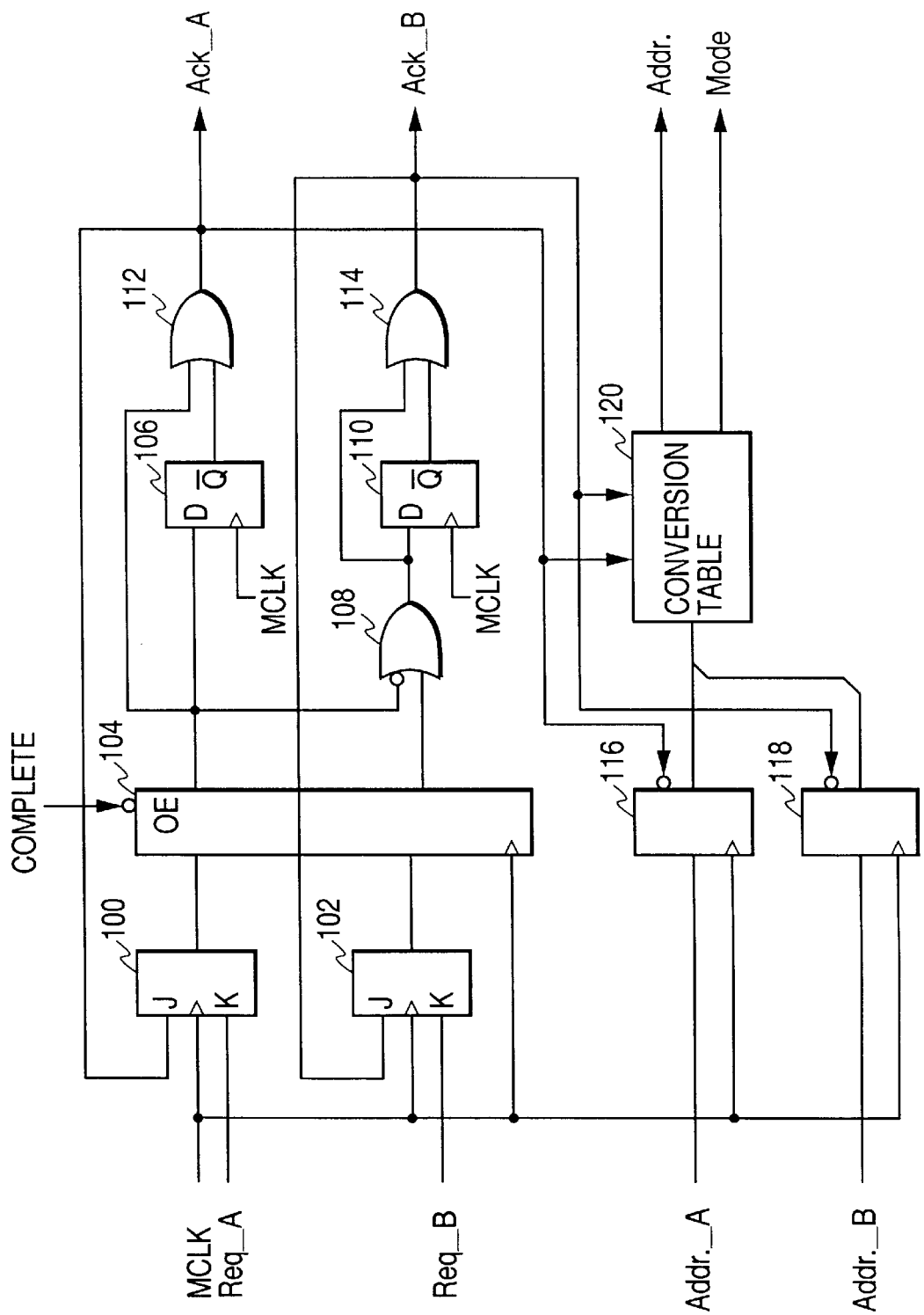
FIG. 11 is a block diagram showing the arrangement of an address conversion circuit 13 in detail.
Figure 12:
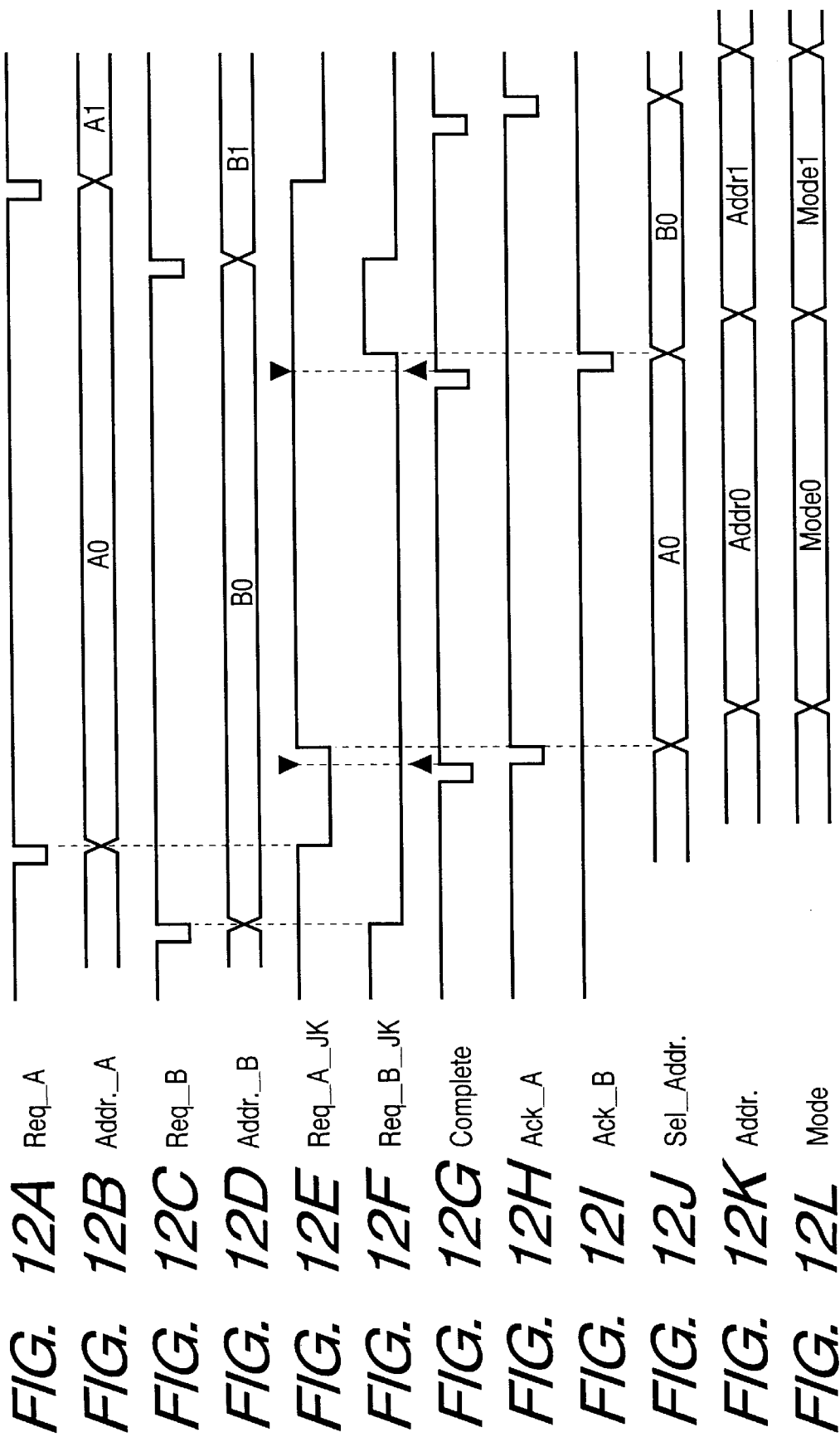
FIGS. 12A, 12B, 12C, 12D, 12E, 12F, 12G, 12H, 12I, 12J, 12K and 12L are timing charts showing the timings of signals in an address circuit shown in FIG. 11.

FIG. 11 is a block diagram showing the arrangement of the address conversion circuit. J-K flip-flops 100 and 102 are synchronized with a master clock signal (to be referred to as MCLK hereinafter), receive access request signals Req_A and Req_B from the two processing blocks A and B at their K terminals, and receive access grant signals Ack_A and Ack_B corresponding to the access request signals at their J terminals. The outputs from these J-K flip-flops are supplied to an output-controlled latch 104. The output of the latch 104 is controlled by a signal (to be referred to as Complete hereinafter) that is supplied from the memory I/F 15 (FIG. 1) and indicates the next access request accept ready state after the memory bus is released. That is, the latch 104 latches the states of the signals Req at the timing of the signal Complete, and outputs the latched states. The Req_A side output of the latch 104 is supplied to a D flip-flop 106 and an OR gate 112, and the output from the OR gate 112 becomes the access grant signal Ack_A for the signal Req_A.

On the other hand, the Req_B side output of the latch 104 is supplied to an OR gate 108 together with the inverted Req_A side output, and the output from the OR gate 108 is supplied to a D flip-flop 110 and an OR gate 114. The output from the OR gate 114 becomes the access grant signal Ack_B for the signal Req_B. Note that the OR gate 108 is required since the priority order of the access request signal Req_B is lower than that of signal Req-A.

Addr-A and Addr_B are logic addresses independent from the real addresses of the main memory, and indicate the head addresses of burst-transferred data (e.g., 64 bytes). These logic addresses are supplied to latches 116 and 118, and one of them is output under the control of the signals Ack_A and Ack_B. The output address is supplied to a conversion table 120, and is converted into a real address for a memory access in correspondence with the states of the signals Ack_A and Ack_B. Also, the conversion table 120 supplies a mode signal indicating the burst length and the like of data to be read/write-accessed to the memory I/F 15 shown in FIG. 1.

The memory I/F 15 increments the real address of the head of transferred data by the burst length using a counter (not shown), and accesses the main memory.

FIGS. 12A to 12L show the timings of the above-mentioned processing operation.

In FIGS. 12A to 12L, A and C are the access request signals Req_A and Req_B from the individual blocks, and B and D are the logic addresses from the individual blocks that change depending on the signals Req_A and Req_B. E and F are the output signals of the J-K flip-flops 100 and 102, which signals are reset to "L" level by the signals Req_A and Req_B, and are set at "H" level by signals Ack_A and Ack_B. G is the signal Complete supplied from the memory I/F 15, as described above, which defines the next access request accept timing. That is, when the signal Complete changes to "L" level, the signals E and F are latched, and a low-active access grant signal Ack_A or Ack_B is output depending on the priority order, as indicated by H and I.

Also, J is the address output from the latches 116 and 118 enabled by the access grant signals Ack_A and Ack_B, and K and L are the addresses converted into the real address, and the mode signal, which are output from the conversion table 120.

In this embodiment, the operation for access requests from the two blocks has been described. The same applies to requests from N blocks.

2. Memory Control upon Interpolation

Memory control upon interpolation realized by the present invention will be described in detail below.

Figure 13:
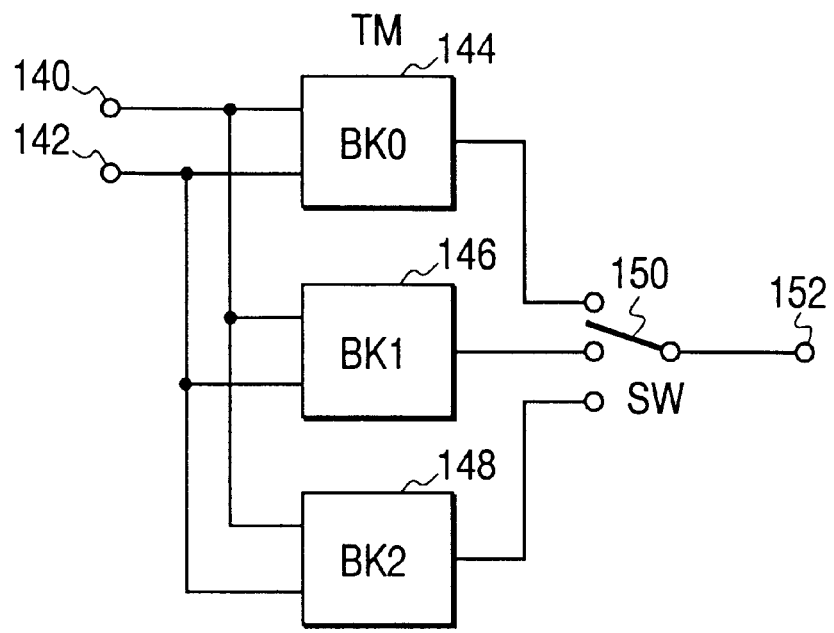
FIG. 13 is a block diagram showing the arrangement for realizing interpolation in the first embodiment.

FIG. 13 is a block diagram showing the arrangement for realizing interpolation of lost image data upon reproduction in the above-mentioned system arrangement. In this case, interpolation is done based on compressed data before decoding in the TM area. In the above embodiment, the TM area for two frames is assured. However, in this embodiment, in order to attain interpolation from the previous frame, a TM area for another frame is assured on an empty area of the memory. That is, interpolation is done using a TM area consisting of three banks. The operation upon reproduction will be exemplified below.

A terminal 140 is an input terminal from the coded data I/O block 11 shown in FIG. 1, and a terminal 142 is an input terminal from the error correction block 9 shown in FIG. 1. These terminals receive the address converted into the real address of the memory by the address conversion circuit 13 in FIG. 1 that arbitrates memory access requests, as described above, image data before decoding, and the like. Frame memories 144 and 146 of the above-mentioned TM area correspond to BK0 and BK1, and a memory 148 for another frame is assured to realize interpolation using the previous frame and corresponds to BK2. Read/write accesses to these three BK areas are controlled by supplying BK information from the system control CPU 19 shown in FIG. 1 to the individual processing blocks and reflecting such information in upper addresses. An SW 150 is controlled by supplying image data to be read out from the memory areas BK0, BK1, and BK2 to the individual processing blocks as BK information under the control of the system control CPU 19 shown in FIG. 1, and reflecting such information in upper addresses. The output from the SW 150 is supplied to the coding/decoding block via, e.g., a terminal 152, and is expanded in the reproduction mode to be written in a predetermined area in the VM area.

Figure 14:
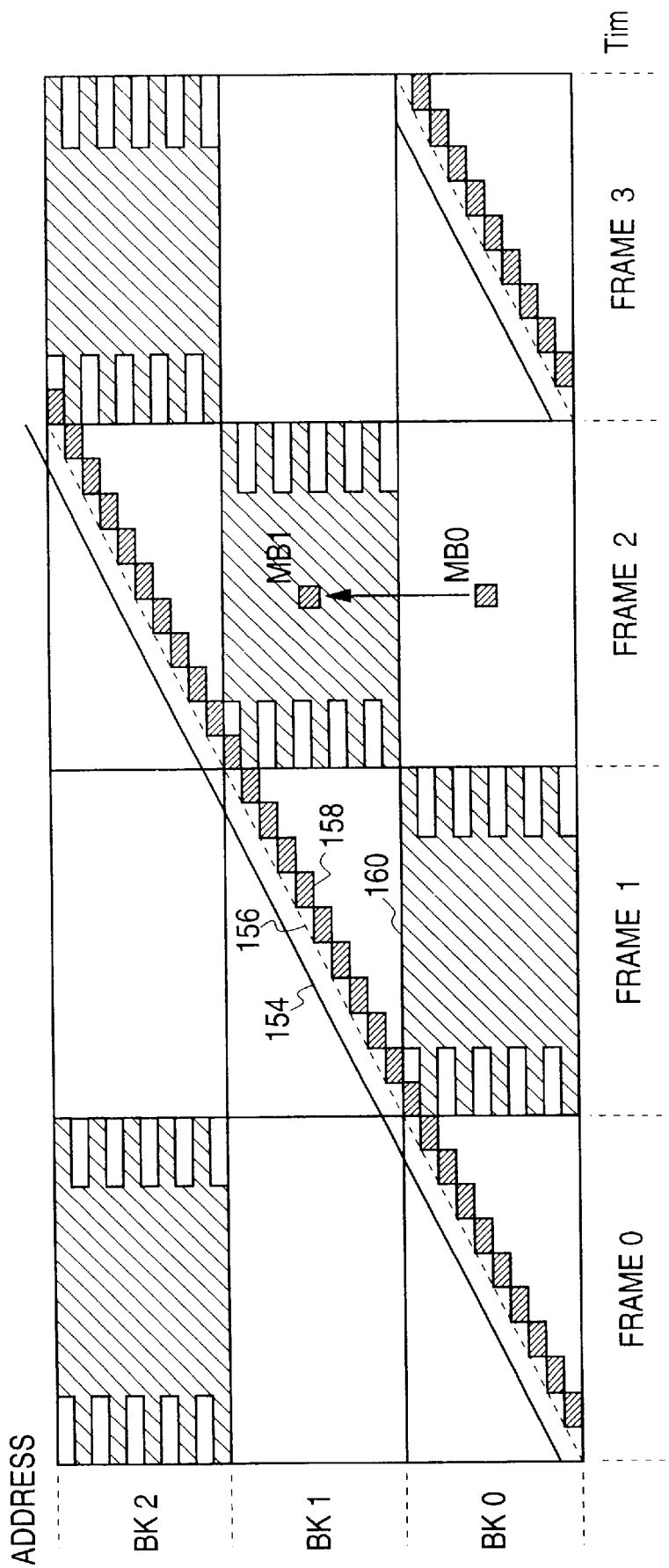
FIG. 14 shows the access states of various processing blocks to a memory in the interpolation of the first embodiment.

FIG. 14 shows the operations of the individual processing blocks in the reproduction mode in the above-mentioned memory arrangement. The ordinate plots the address, and in the respective BK areas, the track number, symbol block number, and symbol number in units of byte data are assigned. The abscissa plots time, and Frame0 to Frame3 represent the frame times of 1/30 sec. A solid line 154 represents the write operation of reproduction data by the coded data I/O block, which accesses the respective BK areas by linear addressing. A dotted line 156 represents the read operation for syndrome calculations of reproduction data written by the coded data I/O block by the error correction block. In this case, the error correction block accesses the respective BK areas by linear addressing delayed by the time corresponding to one track with respect to the write phase of the coded data I/O block. A rectangular-dotted line 158 represents the following operation. That is, after a delay of one track with respect to the read operation for the syndrome calculations, when errors are detected from the calculation results, a specific block that has caused these errors is read out, and is corrected by adding correction data. Thereafter, the corrected data is written at the original address on the memory. In this case, processing of data in one track within one track time is guaranteed. If errors beyond the error correction performance have occurred, an interpolation flag is added in units of MBs to allow some interpolation processing later.

A hatched-block line 160 represents the following processing operation. That is, the coding/decoding block reads out compressed image data before decoding obtained by performing error correction processing of the reproduction data from a predetermined BK area after a delay of one frame, and decodes the readout image data in units of 5 MBs. However, since shuffling processing for alternately accessing 5 MBs of even-numbered tracks and 5 MBs of odd-numbered tracks is executed, tracks that are never accessed are present in respect of time, as shown in FIG. 14.

When the interpolation flag can be detected during decoding processing of the BK1 area during the Frame2 period by the coding/decoding block, the coding/decoding block attains interpolation processing by changing only the BK address to that in the previous frame so as to replace the data of interest by MB data at the identical position in the previous frame. The address phase relationship among the processing blocks is simultaneously managed by the above-mentioned system control CPU 19. Table 1 summarizes the BK phase relationship in the above-mentioned processing.

During the Frame0 period, the coded data I/O block and the error correction block are controlled to access BK0, the normal processing of the coding/decoding block is controlled to access BK2, and the interpolation processing of the coding/decoding block is controlled to access BK1. Similarly, during the Frame1 and Frame2 periods, the individual processing accesses are controlled not to contend and not to cause overtaking of read/write accesses within an identical time period.

TABLE 1

| Block | Bank No. | | |
|---|---|---|---|
| | Frame0 | Frame1 | Frame2 |
| Coded Data I/O/Error Correction | 0 | 1 | 2 |
| Coding/decoding Normal Processing | 2 | 0 | 1 |
| Coding/decoding Interpolation Processing | 1 | 2 | 0 |

The second embodiment of the present invention will be described below with reference to FIGS. 15 to 29.

Figure 15:
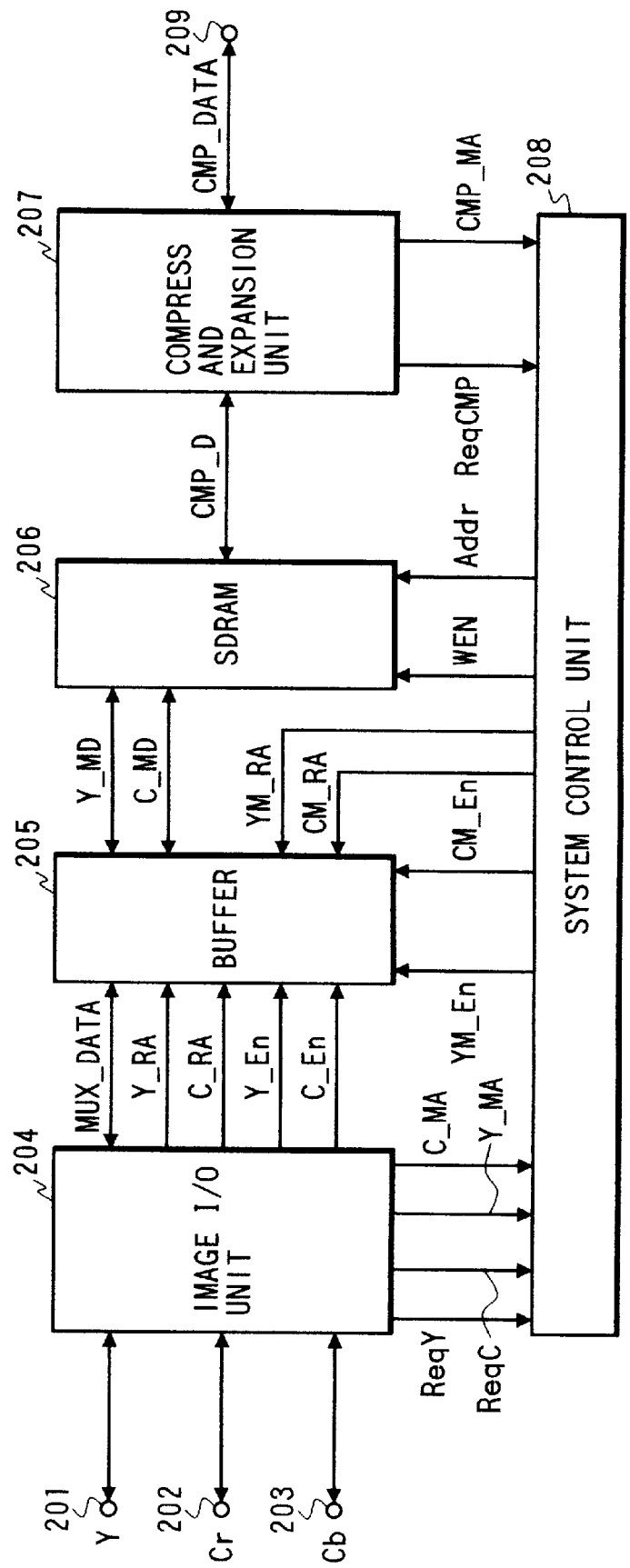
FIG. 15 is a block diagram showing a signal processing apparatus according to the second embodiment of the present invention.

FIG. 15 is a block diagram of a signal processing apparatus according to the second embodiment of the present invention.

In this embodiment, as shown in FIG. 15, various processing blocks or units access a memory at desired timings under the control of a system control unit, and these access requests are arbitrated by the system control unit to guarantee the operations of the individual processing units.

Processing circuits in the processing units operate as follows.

Terminals 201, 202, and 203 are respectively I/O terminals of digital component signals of a D1 format in which the ratio of a luminance signal (to be referred to as a Y signal hereinafter) and color difference signals (to be referred to as Cr and Cb signals hereinafter) is 4:2:2. An image I/O unit 204 decimates color difference signals of the data input from the above-mentioned terminals upon coding to convert the ratio of the luminance signal and color difference signals to 4:1:1 in the NTSC mode or to 4:2:0 in the PAL mode. Furthermore, the image I/O unit 204 outputs a data sequence (to be referred to as MUX_DATA hereinafter) obtained by multiplexing the converted Y, Cr, and Cb signals, and generates addresses Y_RA and C_RA and enable signals Y_EN and C_EN which are used for temporarily buffering Y and Cr/Cb data in the MUX_DATA, and addresses Y_MA and C_MA and memory access request signals ReqY and ReqC for accessing a main memory 206.

Upon decoding, the image I/O unit 204 generates similar signals. At the same time, the image I/O unit 204 reads out the MUX_DATA from a buffer 205, converts it into digital component signals of 4:2:2, and outputs these signals to the terminals 201, 202, and 203. The buffer 205 buffers the MUX_DATA, and luminance signals (to be referred to as Y_MD hereinafter) and color difference signals (to be referred to as C_MD hereinafter) to be written in/read out from the main memory in units of predetermined data lengths in accordance with address signals (Y_RA, C_RA, YM_RA, CM_RA) from the peripheral units, and read/write control signals (Y_En, C_En, YM_En, CM_En). The main memory 206 is subjected to data read/write accesses in synchronism with system clocks. A compression and expansion unit 207 accesses the main memory 206 to variable-length code/decode image data using DCT (Discrete Cosine Transform) transformation.

A system control unit 208 controls the entire system including the main memory in accordance with addresses and memory access signals from the individual units to the main memory.

The main memory 206 in this embodiment uses an SDRAM (Synchronous-DRAM) which realizes high-speed read/write accesses by burst-transferring data in synchronism with the leading edge of a clock signal.

Figure 16:
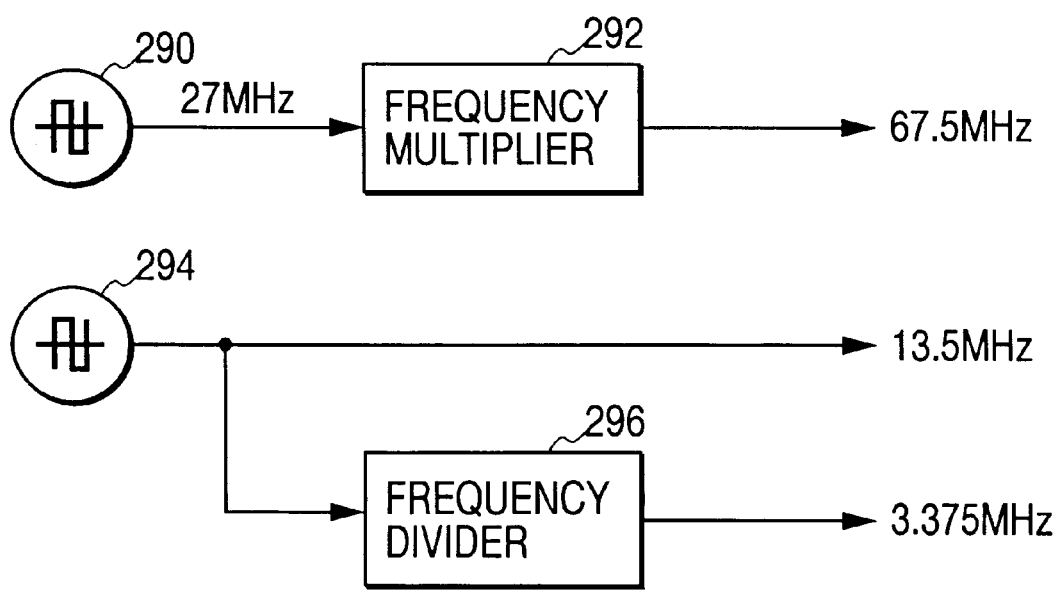
FIG. 16 is a diagram for explaining clock signals used in the second embodiment.

As the clock signal supplied to the SDRAM, an external, jitter-free frequency oscillator 290 shown in FIG. 16 supplies a clock signal of, e.g., 27.5 MHz to a frequency multiplier 292, which generates a clock signal of 67.5 MHz by multiplying the input signal by a given constant and supplies it to the SDRAM as a reference clock signal. The reference clock signal of 67.5 MHz is set to be an integer multiple (5 times) of 13.5 MHz locked to a horizontal synchronization signal (not shown) generated by a frequency oscillator 294. The clock signal of 13.5 MHz supplied from the frequency oscillator 294 corresponds to the sampling frequency of Y signals, and a signal of 3.375 MHz obtained by frequency-dividing the signal of 13.5 MHz by 4 in a frequency divider 296 corresponds to the sampling frequency of Cr and Cb signals upon conversion into digital signals of 4:1:1 or 4:2:0.

The operation for multiplexing Y, Cr, and Cb signals in the image I/O unit 204 shown in FIG. 15 will be described in detail below with reference to FIG. 17. Note that the same reference numerals in FIG. 17 denote the same parts as in FIG. 15.

A normal filter 240 converts image data Y, Cr, and Cb input in the 4:2:2 format into image data EX_Y, EX_Cr, and EX_Cb in the 4:1:1 or 4:2:0 format by decimation upon coding. On the other hand, upon decoding, the filter 240 interpolates the color difference signals of the image data EX_Y, EX_Cr, and EX_Cb in the 4:1:1 or 4:2:0 format to reconstruct image data Y, Cr, and Cb input in the 4:2:2 format, and outputs the reconstructed image data. Note that data EX_Y is synchronized with the above-mentioned frequency 13.5 MHz, and data EX_Cr and EX_Cb are synchronized with the above-mentioned frequency 3.375 MHz. Bidirectional flip-flops 242, 244, and 246 are driven at 67.5 MHz. These flip-flops 242, 244, and 246 generate MUX_DATA synchronized with 67.5 MHz by multiplexing the image data EX_Y, EX_Cr, and EX_Cb upon coding, and generate image data EX_Y, EX_Cr, and EX_Cb by demultiplexing the MUX_DATA upon decoding. Such processing is controlled by enable signals MUX_Y, MUX_Cr, and MUX_Cb supplied from a timing generator 248 and synchronized with 67.5 MHz.

The timing generator 248 generates addresses (Y_RA, C_RA, Y_MA, C_MA), enable signals (Y_En, C_En), and memory access request signals (ReqY and ReqC), which are synchronized with 67.5 MHz, in addition to the above-mentioned enable signals, and supplies them to the peripheral units.

Figure 17:
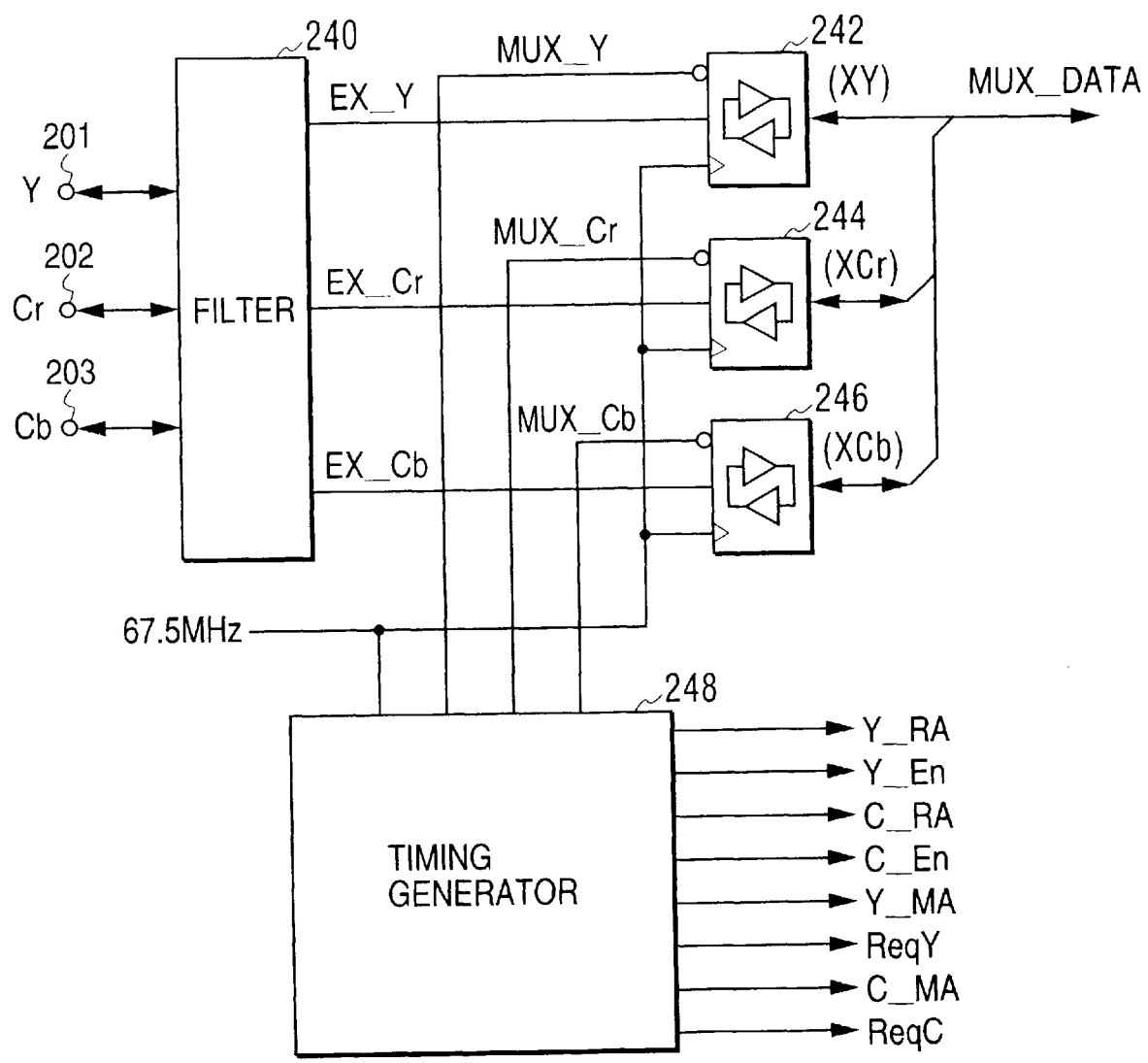
FIG. 17 is a block diagram showing an image I/O unit 204 in detail.
Figure 18:
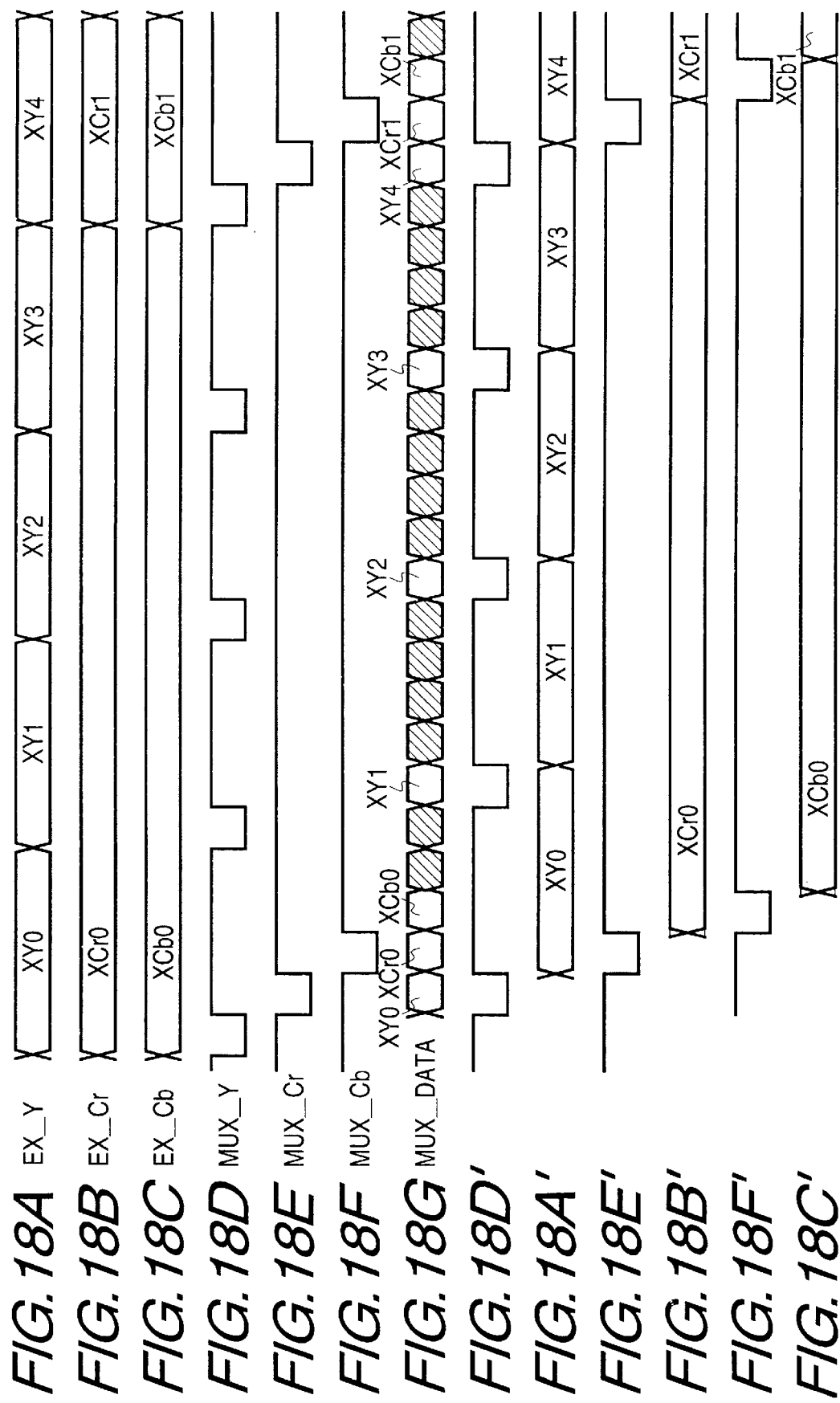
FIGS. 18A, 18B, 18C, 18D, 18E, 18F, 18G, 18A', 18B', 18C', 18D', 18E' and 18F' are timing charts showing the signal timings in multiplexing and demultiplexing in detail in the image I/O unit 204 with the arrangement shown in FIG. 17.

FIGS. 18A to 18G and 18A' to 18F' are timing charts showing the timings of multiplexing and demultiplexing in detail in the arrangement shown in FIG. 17. FIGS. 18A to 18G show the multiplexing timings taking as an example data converted into 4:1:1 signals. FIG. 18A shows luminance data EX_Y synchronized with 13.5 MHz, FIG. 18B shows color difference data EX_Cr synchronized with 3.375 MHz, and FIG. 18C shows difference data EX_Cb synchronized with 3.375 MHz. FIGS. 18D to 18F show enable signals synchronized with 67.5 MHz. The data EX_Y in FIG. 18A is latched and output at 67.5 MHz when the signal MUX_Y in FIG. 18D is at LOW level, data EX_Cr in FIG. 18B is latched and output at 67.5 MHz when the signal MUX_Cr in FIG. 18E is at LOW level, and the data EX_Cb in FIG. 18C is latched and output at 67.5 MHz when the signal MUX_Cr in FIG. 18F is at LOW level, thereby generating multiplexed data MUX_DATA, as shown in FIG. 18G. FIGS. 18G and 18A' to 18F' show the demultiplexing timings. FIGS. 18D', 18E', and 18F' show enable signals MUX_Y, MUX_Cr, and MUX-CB used in demultiplexing. When these enable signals are at LOW level, MUX_DATA is latched and output at 67.5 MHz, thereby generating demultiplexed data EX_Y (FIG. 18A'), EX_Cr (FIG. 18B'), and EX_Cb (FIG. 18C'). Naturally, a data sequence EX_Y is synchronized with 13.5 MHz, and data sequences EX_Cr and EX_Cb are synchronized with 3.375 MHz.

Figure 19:
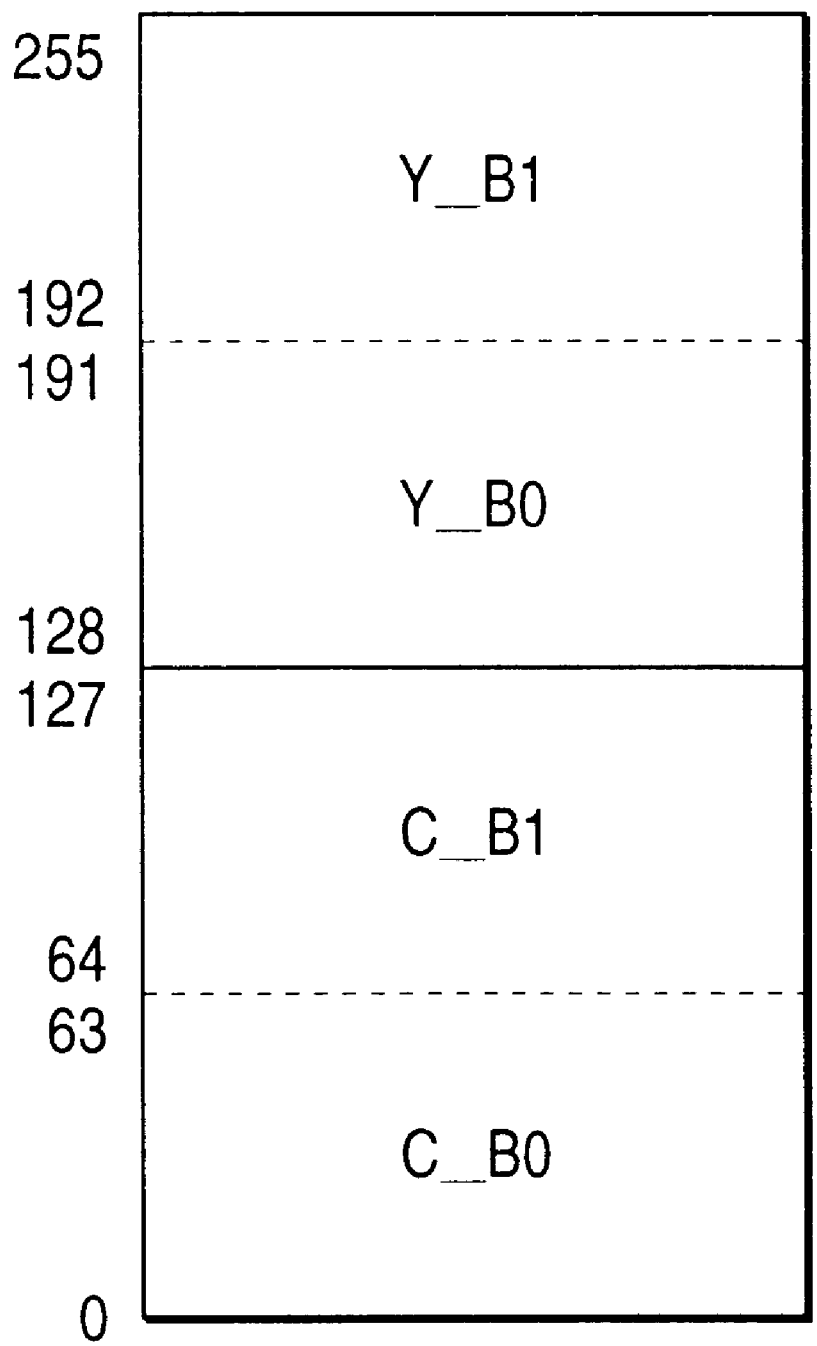
FIG. 19 is a view for explaining mapping of the memory space in a buffer 205.

FIG. 19 shows the memory map of the buffer 205 shown in FIG. 15. The buffer 205 has a total capacity of 256 bytes. The color difference signals EX_Cr and EX_Cb are mapped at addresses 0 to 127, and the luminance signal EX_Y is mapped at addresses 128 to 255. Furthermore, each of the luminance and color difference signal areas is divided into banks in units of 64 bytes. Note that addresses 0 to 63 define bank 0 (to be referred to as C_B0 hereinafter) for the color difference signals, addresses 64 to 127 bank 1 (to be referred to as C_B1 hereinafter) for the color difference signals, addresses 128 to 191 bank 0 (to be referred to as Y_B0 hereinafter) for the luminance signal, and addresses 192 to 255 bank 1 (to be referred to as Y_B1 hereinafter) for the luminance signal. The buffer 205 is controlled by the system control unit 208 so as to prevent contention between read/write accesses of the image I/O unit 204 and the main memory 206 shown in FIG. 15.

FIGS. 20A to 20K and 20A' show the read/write timings with respect to the buffer 205 in detail upon coding. FIG. 20A shows multiplexed data MUX_DATA supplied from the image I/O unit 204 in FIG. 15. FIGS. 20B and 20D show enable signals used for extracting luminance signals (XY0, XY1, ...) and color difference signals (XCr0, XCb0, XCr1, XCb1, ...) from the data MUX_DATA and writing the corresponding areas of the buffer shown in FIG. 19, and FIGS. 20C and 20E show write addresses at that time. Note that the write address Y_RA in FIG. 20C is selected when the signal Y_En in FIG. 20B is at LOW level, and the write address C_RA in FIG. 20E is selected when the signal C_En in FIG. 20D is at LOW level. At this time, the signals Y_En and C_En never change to LOW level at the same time.

Hence, the luminance signals are written in turn from address 128 of Y_B0 in FIG. 19, and the color difference signals are similarly written in turn from address 0 of C_B0. Note that signals at 67.5 MHz for 20 clocks form one packet, and FIG. 20A' shows data in units of packets. Hence, one packet includes luminance data for 4 bytes, and Cr and Cb components of color difference data each for 1 byte.

FIGS. 20F and 20G show memory access signals supplied from the image I/O unit 204 to the system control unit 208, and these signals are output every time luminance and color difference data each for 64 bytes are stored in the buffer. Hence, the memory access request signal of the luminance data is output when packet No. P15 shown in FIG. 20A' is stored in the buffer.

On the other hand, the memory access signal of the color difference data is output when packet No. P31 shown in FIG. 20A' is stored in the buffer. At this time, color difference data for 64 bytes include Cr components for 32 bytes, and Cb components for 32 bytes, and the Cr and Cb components are respectively written at the even- and odd-numbered addresses of the buffer.

Note that this applies to the NTSC mode but does not apply to other modes.

FIGS. 20I and 20K show enable signals YM_En and CM_En generated as a result of arbitration of memory access signals supplied from the individual units in the system control unit 208 in FIG. 15. FIG. 20H shows luminance data Y_MD read out from the buffer during the LOW-level period of the signal YM_En. In the same way, FIG. 20J shows color difference data C_MD read out from the buffer during the LOW-level period of the signal CM_En. Note that the read addresses are generated to read out data from the bank other than the bank in which the image I/O unit in FIG. 15 is writing data in real time.

The even- and odd-numbered read addresses for the color difference data C_MD in this embodiment are separately generated so as to access the SDRAM to read out each of Cr components and Cb components in units of 32 bytes.

FIGS. 21A to 21K show the read/write timings with respect to the buffer 205 upon decoding in detail. The memory access signals ReqY (FIG. 21A) and ReqC (FIG. 21B) are supplied from the image I/O unit 204 in FIG. 15 to the system control block 208 in FIG. 15, and are generated by the timing generator 248 in FIG. 17.

The signal ReqY is generated at ($1/13.5$ MHz×64 byte)-ns periods to access luminance data, and the signal ReqC (FIG. 21B) is generated at ($1/6.75$ MHz×64 byte)-ns periods to access color difference data. Luminance data Y_MD (FIG. 21C) and color difference data C_MD (FIG. 21D) are read out by supplying the read addresses to the main memory 206 in FIG. 15 as a result of arbitration of the memory access request signals by the system control unit 208 in FIG. 15.

Upon memory access in the present invention, the burst length is 64 bytes as in coding. Note that a means for calculating the burst length upon accessing will be described in detail later.

Enable signals YM_En (FIG. 21D) and CM_En (FIG. 21F) are used for writing the data read out from the main memory in units of the burst lengths into the buffer 205 in FIG. 15. During the LOW-level periods of these signals, the corresponding data are written in the buffer.

Although not shown, the system control unit 208 in FIG. 15 supplies the write addresses to the buffer 205. As described above, the write addresses are bank-controlled and are generated not to cause contention with the processing of other units.

Enable signals Y_En (FIG. 21G) and C_En (FIG. 21I) and read addresses Y_RA (FIG. 21H) and C_RA (FIG. 21J) are supplied from the image I/O unit 204 (FIG. 15) to the buffer 205, as has been described above in coding. A data sequence MUX_DATA (FIG. 21K) is obtained by multiplexing the luminance and color difference data latched and output in accordance with the signals Y_En (FIG. 21G) and C_En (FIG. 21I) and the read addresses Y_RA (FIG. 21H) and C_RA (FIG. 21J), and is supplied to the image I/O unit 204 in FIG. 15.

The mapping processing of the main memory 206 in FIG. 15 will be described in detail below.

FIG. 22 shows the memory space of the main memory 206 in FIG. 15, and the memory space is configured by a video memory (VM) area (BS0 and BS1) having a capacity for 2 frames, and Others area having a capacity for storing other data.

Memory cells in each area can be set in the write and read modes in units of frames, and can exchange data with the VM area or Others area as needed.

More specifically, as shown in FIG. 15, the image I/O unit 204 exclusively exchanges data with the VM area. The compression and expansion unit 207 exchanges data with the VM area to read out and code data from the VM area and to supply the coded data to the subsequent processing unit upon coding, and to decode input coded data and to write the decoded data in the VM area upon decoding. At that time, addresses are generated as row addresses and column (to be abbreviated as col hereinafter) addresses by the system control unit 208 in FIG. 15.

The method of calculating the burst length upon accessing the main memory 206 will be described below.

Figure 23A:
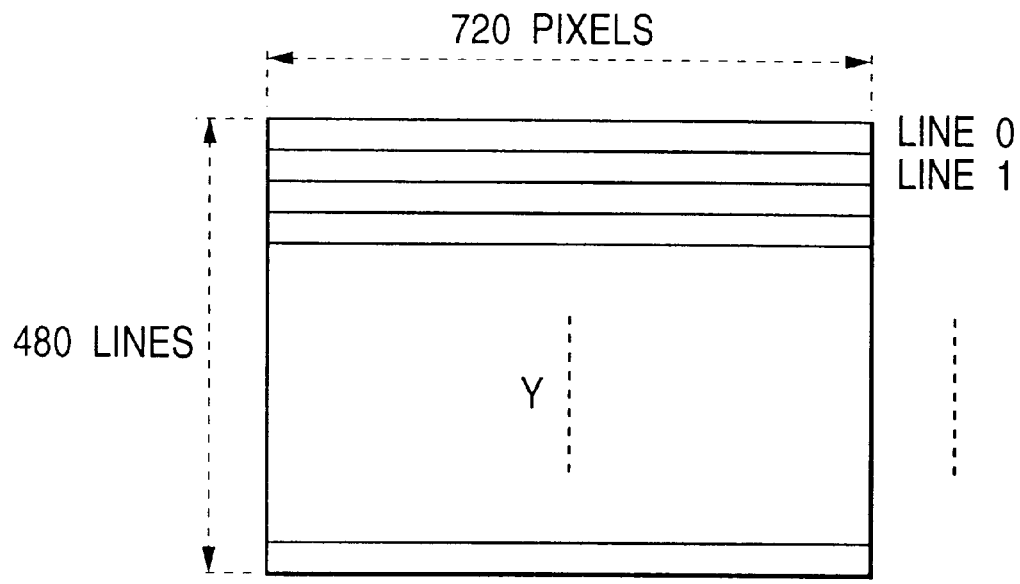
FIGS. 23A and 23B show the formats of luminance and color difference data for one frame in the NTSC scheme.
Figure 23B:
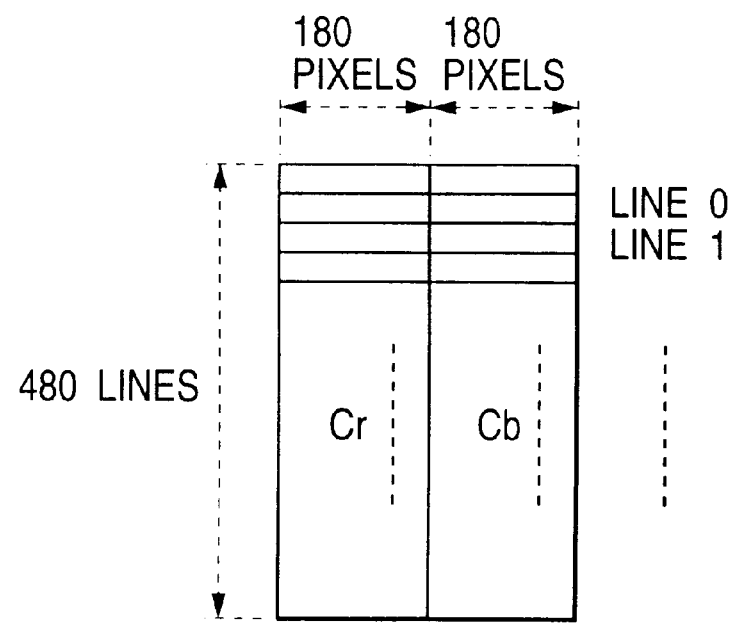

FIG. 23A shows the format of luminance data (to be referred to as Y data hereinafter) for one frame in the NTSC mode converted into the 4:1:1 format, and the luminance data for one frame include 720 pixels (horizontal)×480 lines (vertical). FIG. 23B shows the format of color difference data (to be referred to as Cr and Cb data hereinafter) for one frame in the NTSC mode converted into the 4:1:1 format, and each of Cr and Cb data for one frame include 180 pixels (horizontal)×480 lines (vertical).

Figure 24A:
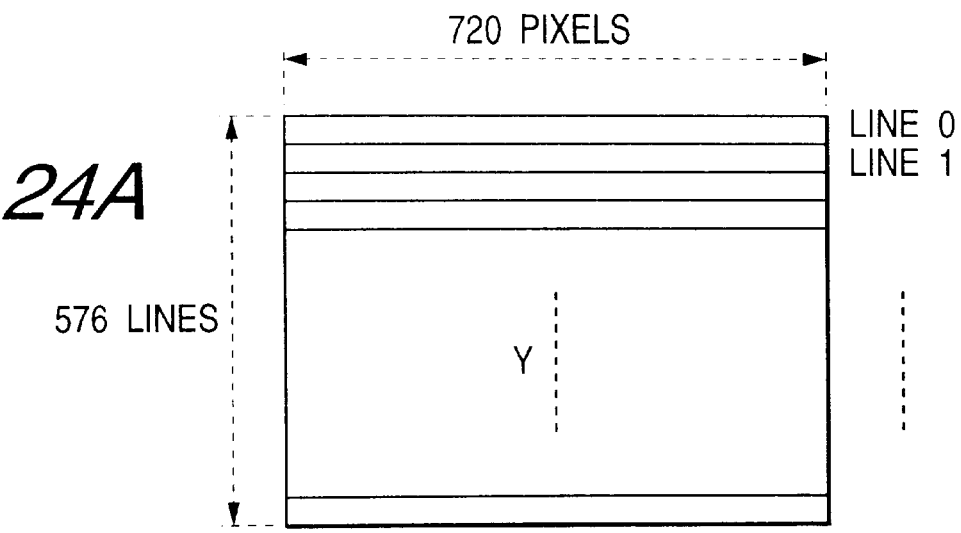
FIGS. 24A and 24B show the formats of luminance and color difference data for one frame in the PAL scheme.
Figure 24B:
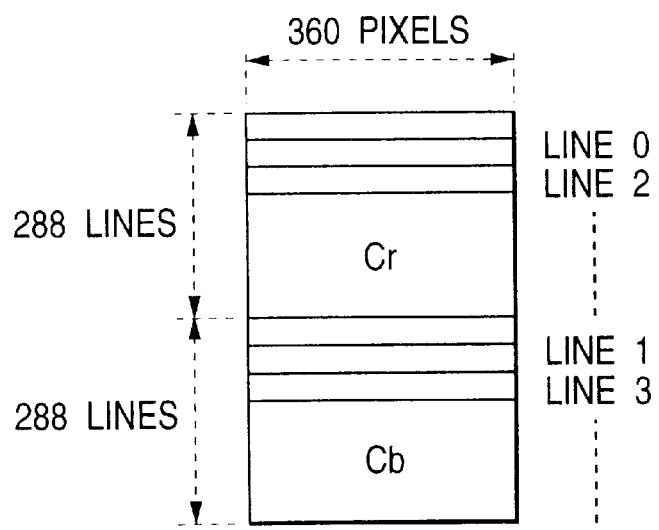

FIG. 24A shows the format of luminance data (to be referred to as Y data hereinafter) for one frame in the PAL mode converted into the 4:2:0 format, and the luminance data for one frame include 720 pixels (horizontal)×576 lines (vertical). FIG. 24B shows the format of color difference data (to be referred to as Cr and Cb data hereinafter) for one frame in the PAL mode converted into the 4:2:0 format, and each of Cr and Cb data for one frame include 360 pixels (horizontal)×288 lines (vertical).

Figure 25:
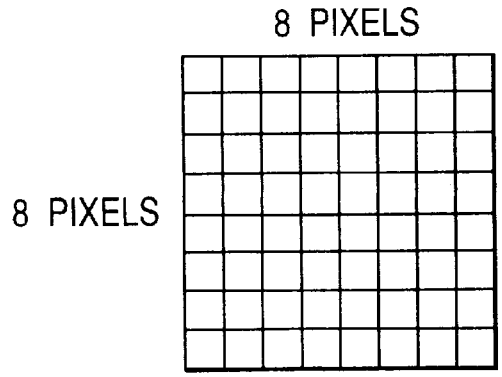
FIG. 25 shows the format of a DCT block upon coding/decoding.

FIG. 25 shows a DCT block used when the compression and expansion unit 207 shown in FIG. 15 executes coding/decoding. Normally, the DCT block is made up of n pixels×m pixels, but n=m=8 is set in this embodiment. In the present invention, the burst length upon accessing the main memory is determined by the following conditional formula:

$$(m \times N) \times n \leq COL \qquad (1)$$

Burst length=m×N

N: a natural number equal to or larger than 1

COL: the capacity of a bank (BS0 and BS1) in the column direction

In this embodiment, since COL=512, formula (1) is rewritten as:

$$8N \times 8 \leq 512 \qquad (2)$$

and hence N≦8. So, the burst length corresponds to a multiple of 8, which is equal to or larger than 8 bytes and equal to or smaller than 64 bytes. In order to efficiently access the SDRAM at high speed, it is desirable to fix the row address and to access the SDRAM by a largest possible burst length. In this embodiment, the burst length is set at 64 bytes.

The access method of Y data in the 4:1:1 mode with respect to the VM area will be described in detail below.

Figure 26:
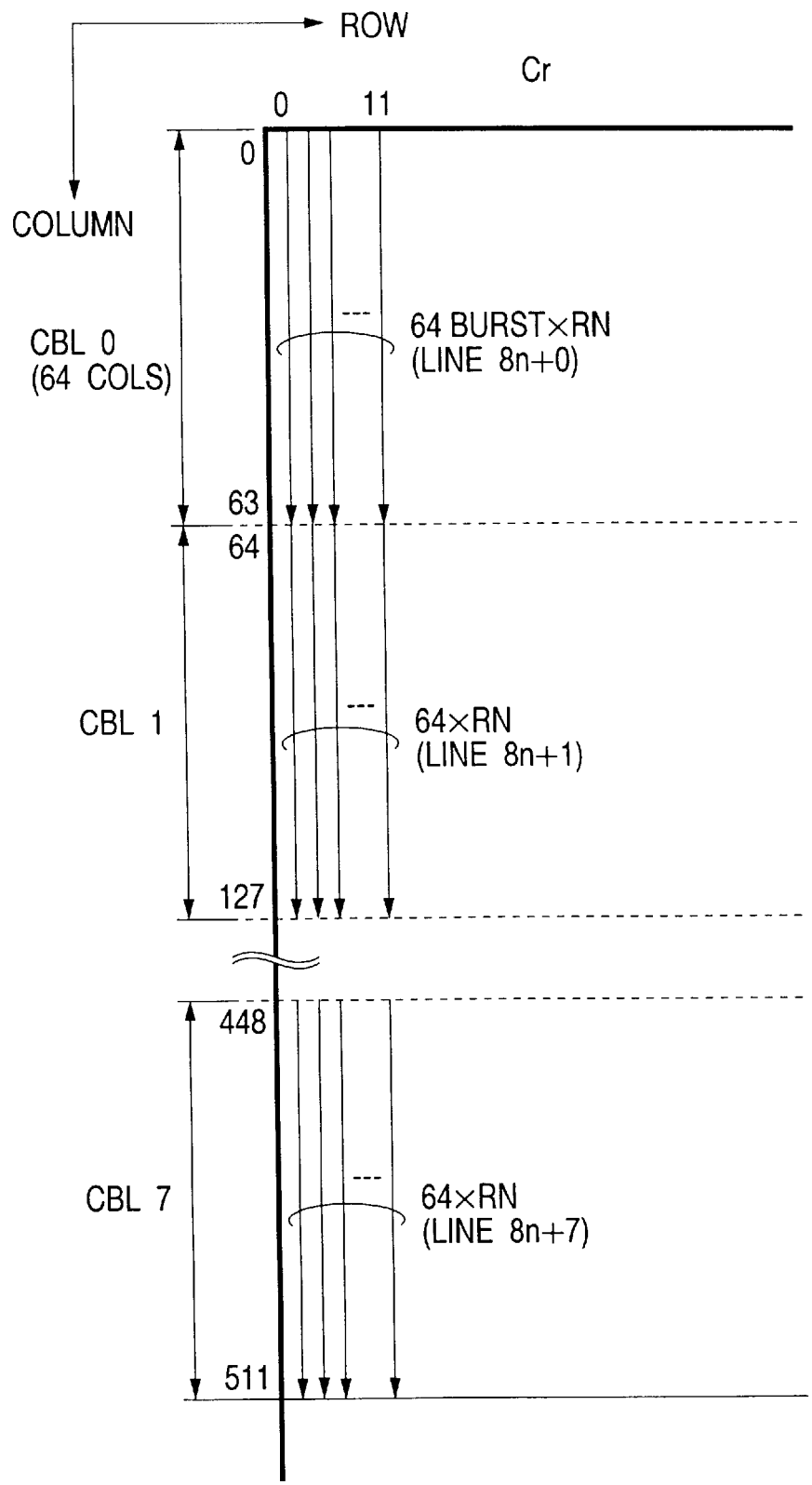
FIG. 26 is an enlarged view of an area A in FIG. 22 to show the mapping state of Y data.

FIG. 26 is an enlarged view of an area A in FIG. 22, and shows the state wherein actual screen image data is allocated on the memory.

Note that CBL0 to CBL7 indicate column blocks divided in units of 64 columns, and RN indicates the number of divisions of one horizontal line. As described above, image data of one line in FIG. 23A is divided into 12 blocks in units of 64 pixels, and the 12 divided blocks of Line 0 are sequentially stored in an area CBL0 in FIG. 26 while incrementing the col address by the burst length in the row direction (address 0 to address 11). Similarly, data of Line 1 are sequentially stored in an area CBL1. The same applies to image data of the remaining lines.

Hence, the area CBL0 sequentially stores data in the (8n+0)-th (n is a positive value equal to or larger than 0) line in FIG. 23A, the area CBL1 data in the (8n+1)-th line, the area CBL2 data in the (8n+2)-th line, the area CBL3 data in the (8n+3)-th line, the area CBL4 data in the (8n+4)-th line, the area CBL5 data in the (8n+5)-th line, the area CBL6 data in the (8n+6)-th line, and the area CBL7 data in the (8n+7)-th line.

At an identical row address of the memory space stored as described above, eight 8 pixel×8 pixel DCT blocks shown in FIG. 25 are present in the horizontal direction of the screen.

Hence, when the compression and expansion unit 207 in FIG. 15 reads out and codes such data, it can obtain desired 8 pixel×8 pixel DCT block data by successively reading out eight data from the head addresses of the blocks CBL0 to CBL7. Subsequently, eight data are successively read out while offsetting the col address by 8 with respect to the blocks CBL0 to CBL7, thereby sequentially forming DCT blocks and processing them.

On the other hand, upon decoding, contrarily to coding, eight 8 pixel×8 pixel data decoded by the compression and expansion unit 207 in FIG. 15 are successively written in the blocks CBL0 to CBL7 while offsetting the col address by 8, thereby storing the data, as shown in FIG. 26. The image I/O unit 204 in FIG. 15 successively reads out the data in units of 64 bursts while sequentially offsetting the row address. In the 4:2:0 mode, the same processing is done.

The access method of Cr and Cb data with respect to the VM area will be described in detail below.

First, the memory access operation of the image I/O unit 204 in FIG. 15 will be described.

As shown in FIG. 23B, color difference data in the 4:1:1 mode is decimated to ¼ in the horizontal direction, and Cr and Cb data are simultaneously present in each line. The DCT block format of the color difference data is 8 pixels×8 pixels as in the luminance data, and the capacity per bank in the COL direction is 512 bytes. Hence, the burst length in one access is 64 bytes as in the luminance data. In this case, owing to the nature of the color difference data in the 4:1:1 mode, the burst length of 64 bytes in one access includes 32 bytes for Cr data and 32 bytes for Cb data.

Figure 27B:
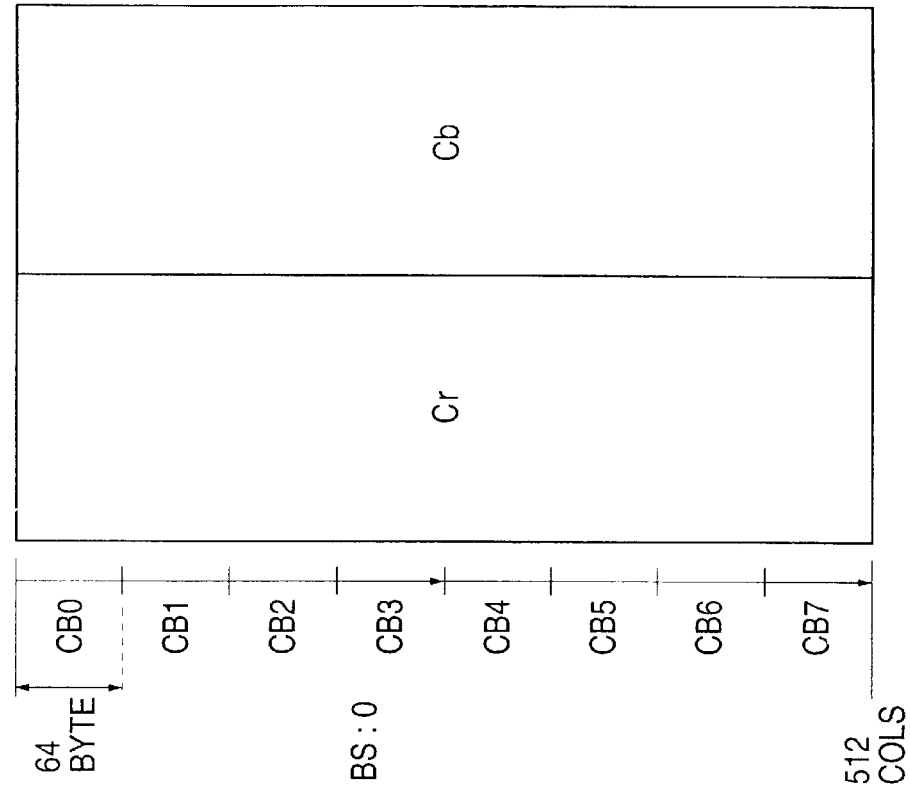
FIGS. 27A and 27B are views for explaining bank 0 in a Cr/Cb area in the main memory 206.
Figure 27A:
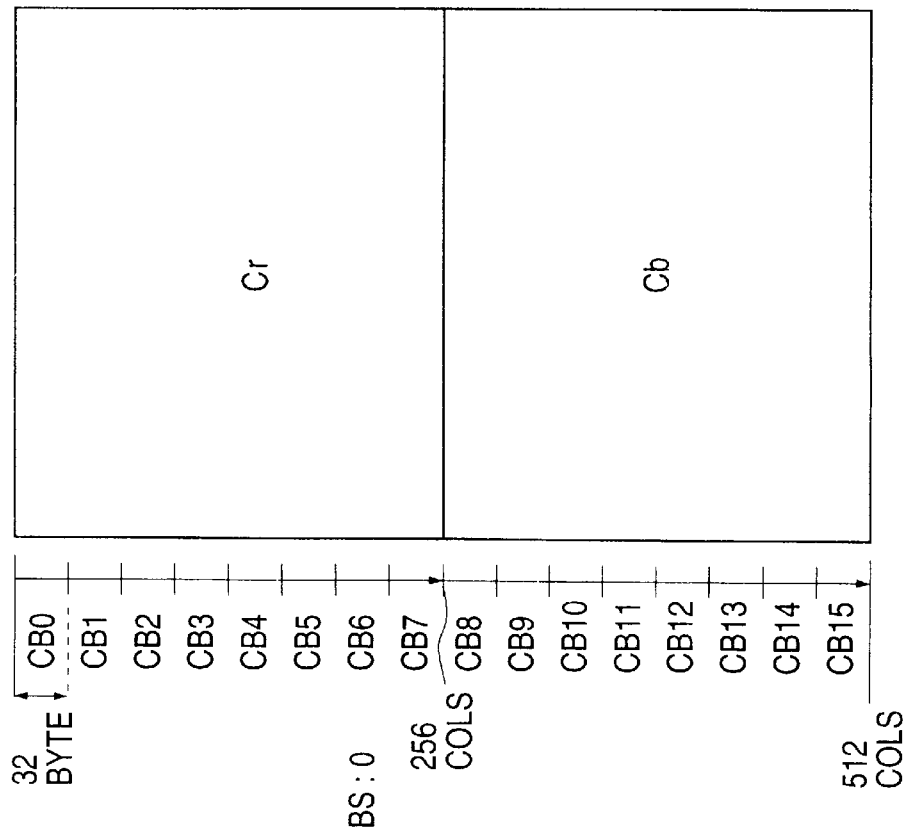

FIG. 27A shows bank 0 in the Cr/Cb area in FIG. 22 in the 4:1:1 mode. Cr and Cb data are divided by col addresses, so that a Cr area is formed by col addresses 0 to 255, and a Cb area by col addresses 256 to 511. CBL0 to CBL15 indicate column blocks obtained by dividing the Cr and Cb areas in units of 32 columns. In both the read and write modes, 64 bytes of color difference data are accessed in such a manner that an access for 32 bytes of Cr data is made to CBL0, and an access for 32 bytes of Cb data is made to CBL8. Every time the line of interest shifts, the access areas shift like CBL1 and CBL9, CBL2 and CBL10, . . . .

Figure 28:
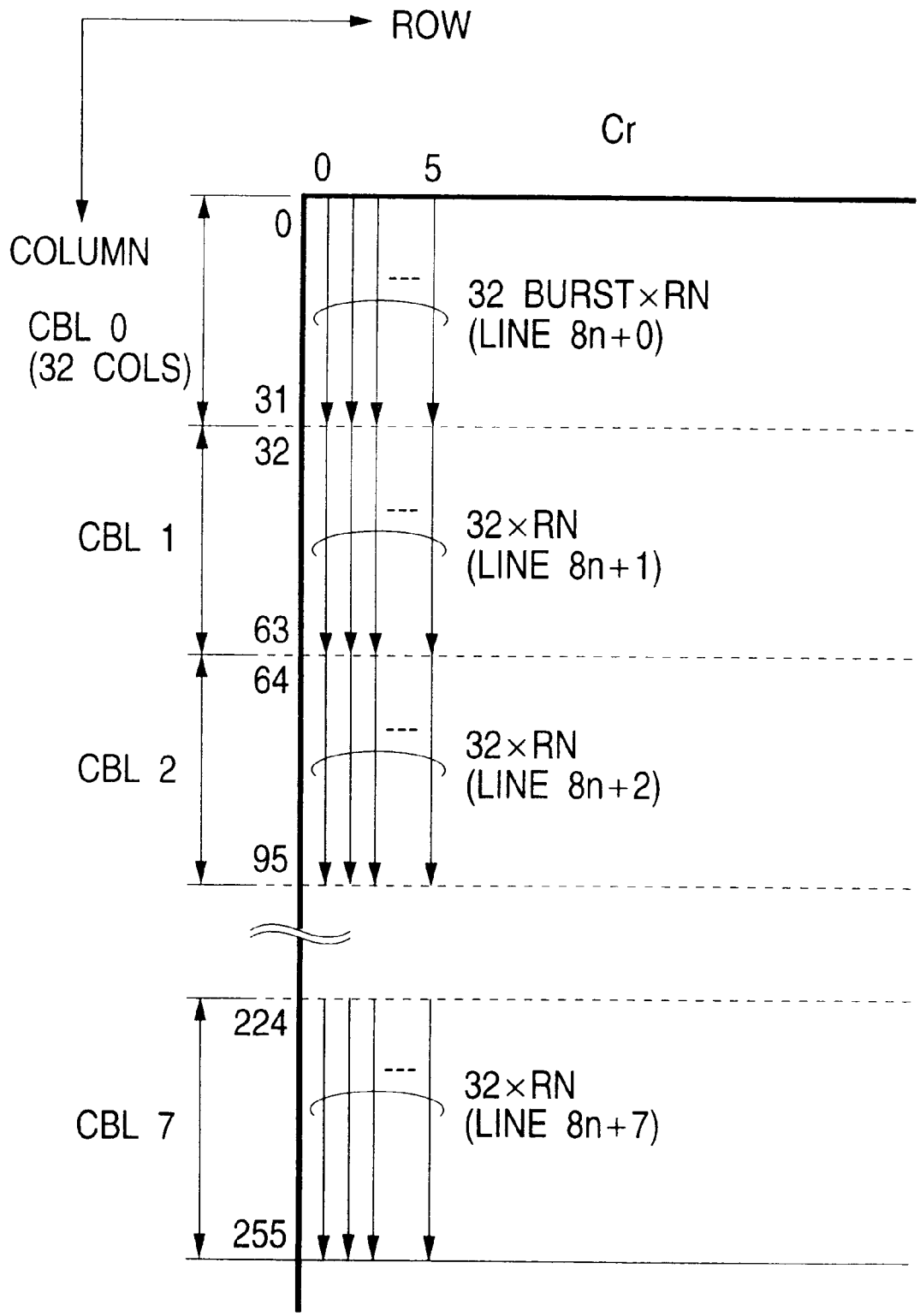
FIG. 28 is an enlarged view of bank 0 of the Cr area in FIG. 27A to show the mapping state of Cr data.

FIG. 28 is an enlarged view of bank 0 in the Cr area in FIG. 27A and shows the processing in detail.

Note that RN indicates the number of divisions of one horizontal line, and RN=5 in the case of color difference data. As described above, each of Cr and Cb data of image data for one line in FIG. 23B is divided into six blocks in units of 32 pixels. The six divided blocks of Line 0 are sequentially processed in the case of Cr data, as shown in the area CBL0, while incrementing the col address by the burst lens in the row direction (address 0 to address 5). Likewise, six blocks of Cb data are processed with respect to the area CBL8.

Also, Cr and Cb data of Line 1 are similarly processed with respect to the areas CBL1 and CBL9. The same applies to image data in the remaining lines. Hence, Cr and Cb data in the (8n+0)-th (n is a positive number equal to or larger than 0) line in FIG. 23B are respectively processed on the areas CBL0 and CBL8, Cr and Cb data in the (8n+1)-th line on the areas CBL1 and CBL9, Cr and Cb data in the (8n+2)-th line on the areas CBL2 and CBL10, Cr and Cb data in the (8n+3)-th line on the areas CBL3 and CBL11, Cr and Cb data in the (8n+4)-th line on the areas CBL4 and CBL12, Cr and Cb data in the (8n+5)-th line on the areas CBL5 and CBL13, Cr and Cb data in the (8n+6)-th line on the areas CBL6 and CBL14, and Cr and Cb data in the (8n+7)-th line on the areas CBL7 and CBL15.

Next, the memory access operation of the compression and expansion unit 207 in FIG. 15 will be described.

For example, at an identical row address of the memory space in which the Cr and Cb data in the 4:1:1 mode are written as described above, eight 8 pixel×8 pixel DCT blocks shown in FIG. 25 for Cr and Cb data are present in the horizontal direction of the screen.

Hence, when the compression and expansion unit 207 in FIG. 15 reads out and codes such data, it can obtain Cr data of desired 8 pixel×8 pixel DCT blocks by successively reading out eight data from the head addresses of the blocks CBL0 to CBL7. Similarly, the unit 207 can obtain Cb data of desired 8 pixel×8 pixel DCT blocks by successively reading out eight data from the head addresses of the blocks CBL8 to CBL15.

Subsequently, eight data are successively read out while offsetting the col address by 8 with respect to the blocks CBL0 to CBL7 and CBL8 to CBL15, thereby sequentially forming DCT blocks of Cr and Cb data and processing them.

On the other hand, upon decoding, contrarily to coding, eight 8 pixel×8 pixel data decoded by the compression and expansion unit 207 in FIG. 15 are successively written in the blocks CBL0 to CBL7 and CBL8 to CBL15 while offsetting the col address by 8, thereby storing the data, as shown in FIG. 28. The image I/O unit 204 in FIG. 15 successively reads out data in units of 64 bursts each including 32 bytes of Cr data and 32 bytes of Cb data while sequentially shifting the row address.

The processing operation in the 4:2:0 mode will be explained below.

As shown in FIG. 24B, color difference data in the 4:2:0 mode is decimated to ½ in the vertical direction, and either Cr or Cb data is alternately present in each line. The DCT block format of color difference data is 8 pixels×8 pixels as in luminance data, and the capacity per bank in the COL direction is 512 bytes.

Hence, the burst length in one access for each of Cr and Cb data is 64 bytes as in the luminance data. FIG. 27B shows bank 0 in the Cr/Cb area in FIG. 22 in the PAL mode. Cr and Cb data are divided by col addresses, so that a Cr area is formed by col addresses 864 to 1079, and a Cb area is formed by col addresses 1080 to 1294. CBL0 to CBL15 indicate column blocks obtained by dividing the Cr and Cb areas in units of 64 columns.

In both the read and write modes of Cr data, an access of 64 bytes of color difference data is made in the case of even-numbered lines shown in FIG. 24B. For example, in the case of Line 0, an access of 64 bytes of Cr data is made to CBL0. Every time the line of interest shifts, the access area shifts within the range up to CBL7. The detailed processing operation will be described with reference to FIG. 25.

Figure 29:
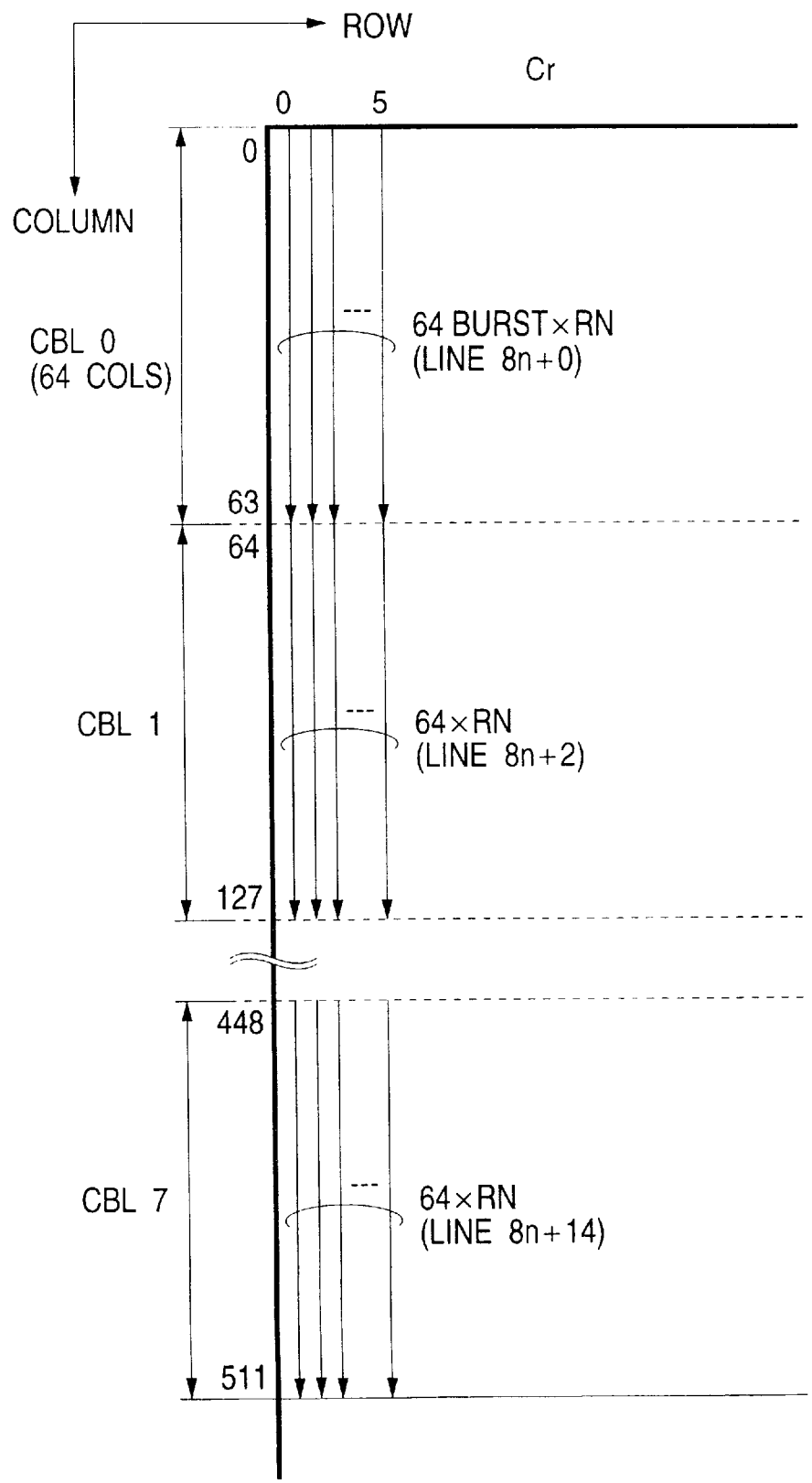
FIG. 29 is an enlarged view of the Cr area in FIG. 27B to show the mapping state of Y data.

FIG. 29 is an enlarged view of the Cr area in FIG. 27B, and shows the state wherein actual screen image data is allocated on the memory.

Note that CBL0 to CBL7 indicate column blocks divided in units of 64 columns, and RN indicates the number of divisions of one horizontal line. As described above, image data of one line in FIG. 24B is divided into six blocks in units of 64 pixels, and these six divided blocks of Line 0 are sequentially stored in an area CBL0 in FIG. 29 while incrementing the col address by the burst length in the row direction (address 0 to address 5). Similarly, data of Line 1 are sequentially stored in an area CBL1. The same applies to image data of the remaining lines.

Hence, the area CBL0 sequentially stores data in the (8n+0)-th (n is a positive value equal to or larger than 0) line in FIG. 24B, the area CBL1 data in the (8n+2)-th line, the area CBL2 data in the (8n+4)-th line, the area CBL3 data in the (8n+6)-th line, the area CBL4 data in the (8n+8)-th line, the area CBL5 data in the (8n+10)-th line, the area CBL6 data in the (8n+12)-th line, and the area CBL7 data in the (8n+14)-th line.

As for the Cb area, although not shown, the area CBL0 sequentially stores data in the (8n+1)-th (n is a positive value equal to or larger than 0) line in FIG. 24B, the area CBL1 data in the (8n+3)-th line, the area CBL2 data in the (8n+5)-th line, the area CBL3 data in the (8n+7)-th line, the area CBL4 data in the (8n+9)-th line, the area CBL5 data in the (8n+11)-th line, the area CBL6 data in the (8n+13)-th line, and the area CBL7 data in the (8n+15)-th line. The memory accesses of the compression and expansion unit 207 in FIG. 15 are made in the same manner as in other modes, and Cr and Cb data are respectively processed in units of desired 8 pixel×8 pixel DCT blocks.

Note that the Cr and Cb area division means shown in FIGS. 27A and 27B is an example. For example, the Cr and Cb areas in FIG. 27A may be alternately divided in the col address direction in units of 32 bytes. That is, the Cr and Cb areas need only be divided by the col addresses, and successive data for the burst length calculated by the conditional formula need only be allocated on identical row addresses. In FIG. 27B, the Cr and Cb areas need only be divided by the row addresses, and successive data for the burst length calculated by the conditional formula need only be allocated on identical row addresses.

Figure 30:
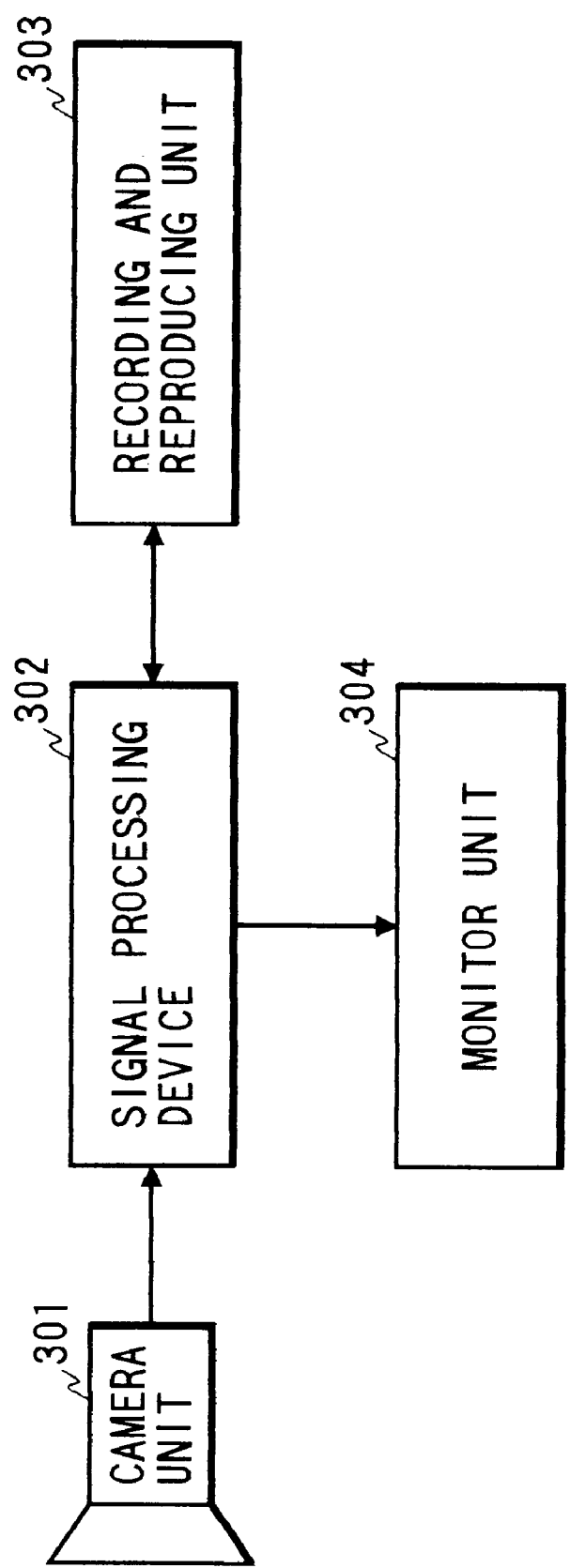
FIG. 30 is a block diagram showing the arrangement used when the signal processing apparatus of the first or second embodiment is applied to a camera built-in type VTR.

When a camera built-in type digital video comprises the signal processing apparatus of this embodiment, as shown in FIG. 30, the required memory capacity can be reduced, and a cost reduction can be accomplished.

The digital video shown in FIG. 30 comprises a camera unit 301 for generating image data by converting an object image into electrical signals, and a signal processing device 302 that executes the processing described in the first or second embodiment.

Also, the digital video comprises a recording and reproducing unit 303 for recording/reproducing image data processed by the signal processing device 302 onto/from a recording medium such as a magnetic tape, and a monitor unit 304 for displaying the image data processed by the signal processing device 302 using a liquid crystal monitor or the like.

The operation of the camera built-in type digital video with the above-mentioned arrangement will be described below.

A video signal sensed by the camera unit 301 is input to the signal processing device 302, and is coded by the processing described above in the first or second embodiment. Image data which is being sensed can be displayed on the monitor unit 304.

The image data coded by the signal processing device 302 is recorded on the recording medium by the recording and reproducing unit 303.

The image data recorded on the recording medium is reproduced by the recording and reproducing unit 303, and is decoded by the processing described above in the first or second embodiment in the signal processing unit 302. The decoded image data is output to and displayed on the monitor unit 304.

In other words, the foregoing description of embodiments has been given for illustrative purposes only and not to be construed as imposing any limitation in every respect.

The scope of the invention is, therefore, to be determined solely by the following claims and not limited by the text of the specifications and alterations made within a scope equivalent to the scope of the claims fall within the true spirit and scope of the invention.

What is claimed is:

1. A signal processing apparatus for performing signal processing of image data in units of blocks each consisting of n (vertical)×m (horizontal) pixels, the image data being constructed with luminance component data and chrominance component data of two chrominance components, said apparatus comprising:
    a) a memory for storing the image data;
    b) division means for dividing image data in one horizontal period of the image data into burst lengths, each of which equals at least a multiple of m and in which the multiple of m×n is not more than a capacity of said memory; and
    c) allocation means for allocating data sequences of the burst length at an identical row address of said memory so that all image data in the block are aligned at the identical row address, said allocation means putting together the image data of one picture on a component-by-component basis and allocating the luminance component data in one area of the memory, and the chrominance component data of one of the two chrominance components in a second area of the memory, and the chrominance component data of the other of the two chrominance components in a third area of the memory.

2. An apparatus according to claim 1, wherein said memory can perform a burst read and write of data in synchronism with a predetermined clock.

3. An apparatus according to claim 2, wherein said memory comprises an SDRAM (synchronous-DRAM).

4. An apparatus according to claim 1, wherein said signal processing apparatus can input image data of a plurality of television schemes as the image data.

5. An apparatus according to claim 1, further comprising: coding means for coding the image data in units of blocks.

6. An apparatus according to claim 5, further comprising: recording means for recording the image data coded by said coding means onto a recording medium.

7. An apparatus according to claim 5, further comprising: image sensing means for sensing an object image and outputting the image data.

8. A storage method for storing image data in a memory to perform signal processing of the image data in units of blocks each consisting of n (vertical)×m (horizotal) pixels, the image data being constructed with luminance component data and chrominance component data of two chrominance components, said method comprising the steps of:
    a) dividing image data in one horizontal period of the image data into blocks each having a burst length, which equals at least a multiple of m and in which the multiple of m×n is not more than a capacity of the memory; and
    b) allocating data sequences of the burst length at an identical row address so that all image data in the block are aligned at the identical new address, said allocating step including a step of putting together the image data of one picture on a component-by-component basis, and allocating the luminance component data in one are of the memory, and the chrominance component data of one of the two chrominance components in a second area of the memory, and the chrominance component data of the other of the two chrominance components in a third area of the memory.

9. A signal processing apparatus for performing a signal processing of image data, comprising:
    a) a plurality of processing means for performing different processings on the image data on a perdetermined data unit basis, respectively;
    b) memory means used in common for said plurality of processing means and having an input-output unit which can transmit data of a predetermined unit at high speed; and
    c) allocation means for allocating the image data in an area of said memory means so that the predetermined unit of data, which can be transmitted at the high speed by said input-output, unit corresponds to the predetermined data unit which is processed by each of said plurality of processing means,
    wherein the image data corresponds to image data of different kings of broadcasting systems and is composed of a plurality of types of color component data, and wherein said allocation means changes allocation of the image data in said memory means, according to broadcasting system, on a color-component-by-color-component basis.

10. An apparatus according to claim 9, wherein said plurality of processing means include at least encoding means for encoding the image data.

11. An apparatus according to claim 9, further comprising recording means for recording the image data encoded by said encoding means on a recording medium.

12. An apparatus according to claim 9, further comprising image pickup means for picking up an object image to output the image data.

13. An apparatus according to claim 9, wherein said memory means is a synchronous-DRAM.

14. A signal processing apparatus for performing a signal processing of image data, comprising:
    a) a plurality of processing means for performing different processings on the image data on a predetermined data unit basis;
    b) memory means being used in common for said plurality of processing means and including an input-output unit which can transmit data of a predetermined data unit at a high speed; and
    c) allocation means for allocating the image data in an area of said memory means so that the data of the predetermined unit, which can be transmitted at the high speed by said input-output unit, corresponds to the predetermined data unit which is processed by said each of said plurality of processing means,
    wherein the image data is constructed with luminance component data and chrominance component data of two chrominance components, and wherein said allocation means puts together the image data of one picture on a component-by-component basis and allocates the luminance component data in one area of said memory means, and the chrominance component data of one of the two chrominance components in a second area of said memory means, and the chrominance component data of the other of the two chrominance components in a third area of said memory means.

15. An apparatus according to claim 16, wherein said plurality of processing means include at least encoding means for encoding the image data.

16. An apparatus according to claim 15, further comprising recording means for recording the image data encoded by said encoding means on a recording medium.

17. An apparatus according to claim 16, further comprising image pickup means for picking up an object image to output the image date.

18. An apparatus according to claim 16, wherein said memory means is a synchronous-DRAM.

19. A signal processing method of performing a signal processing of image data, comprising:

a) a processing step, of performing different processings on the image data on a predetermined data unit basis by using a plurality of processing means respectively, the plurality of processing means using, in common, memory means which includes an input-output unit which can transmit data of a predetermined unit at high speed; and b) an allocation step, of allocating the image data in an area of the memory means so that the predetermined unit of data, which can be transmitted at the high speed by the input-output unit, corresponds to the predetermined data unit which is processed by each of the plurality of processing means, wherein the image data corresponds to image data of different kinds of broadcasting systems and is composed of a plurality of types of color component data, and wherein said allocation step includes a step of changing allocation of the image data in the memory means, according to broadcasting system, on a color-component-by-color-component basis.

20. A signal processing method of performing a signal processing of image data, comprising:

a) a processing step, of performing different processings on the image data on a predetermined data unit basis by using a plurality of processing means respectively, the plurality of processing means using, in common, memory means which includes an input-output unit which can transmit data of a predetermined data unit at a high speed; and b) an allocation step, of allocating the image data in an area of the memory means so that the data of the predetermined unit, which can be transmitted at the high speed by the input-output unit, corresponds to the predetermined data unit which is processed by each of the plurality of processing means, wherein the image data is constructed with luminance component data and chrominance component data of two chrominance components, and wherein said allocation step includes a step of putting together the image data of one picture on a component-by-component basis and allocating the luminance component data in one area of the memory means, and the chrominance component data of one of the two chrominance components in a second area of the memory means, and the chrominance component data of the other of the two chrominance components in a third area of the memory means.

* * * * *

UNITED STATES PATENT AND TRADEMARK OFFICE
CERTIFICATE OF CORRECTION

PATENT NO. : 6,374,033 B2
DATED : April 16, 2002
INVENTOR(S) : Hidenori Hoshi

It is certified that error appears in the above-identified patent and that said Letters Patent is hereby corrected as shown below:

Title page,
Item [56], FOREIGN PATENT DOCUMENTS, "DE 44412955" should read
-- DE 4441295 --.

Column 1,
Line 45, "is" should be deleted.

Column 20,
Line 3, "are" should read -- area --;
Line 20, "input-output, unit" should read -- input-out unit, --;
Line 24, "kings" should read -- kinds --;
Line 28, "color-component-by color-" should read -- color-component-by-color --;
Line 54, "said each of said" should read -- each of said --.

Column 21,
Line 1, "claim 16," should read -- claim 14, --;
Line 7, "claim 16," should read -- claim 14, --;
Line 10, "claim 16," should read -- claim 14, --.

Signed and Sealed this

First Day of April, 2003

JAMES E. ROGAN
*Director of the United States Patent and Trademark Office*